(12) United States Patent
Maben et al.

(10) Patent No.: US 12,710,193 B2
(45) Date of Patent: Aug. 18, 2026

(54) SELF-MUFFLING ACOUSTIC DUCT ASSEMBLY FOR NOISE ATTENUATION IN A VEHICLE AND METHOD OF USING THE SAME

(71) Applicant: The Boeing Company, Arlington, VA (US)

(72) Inventors: Douglas D. Maben, Snohomish, WA (US); Bryce A. Vandyke, Snohomish, WA (US); Rachel A Bires, Lake Stevens, WA (US); Sonny K. Nguyen, Mill Creek, WA (US); Matthew J. Koithan, Everett, WA (US); Gary A. Pearson, Snohomish, WA (US); David W. Olson, Gold Bar, WA (US); James J. Koch, Everett, WA (US); Quinn A. Joyce, Seattle, WA (US)

(73) Assignee: The Boeing Company, Arlington, VA (US)

( * ) Notice: Subject to any disclaimer, the term of this patent is extended or adjusted under 35 U.S.C. 154(b) by 378 days.

(21) Appl. No.: 18/435,841

(22) Filed: Feb. 7, 2024

(65) Prior Publication Data

US 2025/0251167 A1 Aug. 7, 2025

(51) Int. Cl.
*F24F 13/02* (2006.01)
*B32B 1/08* (2006.01)
(Continued)

(52) U.S. Cl.
CPC .......... *F24F 13/0263* (2013.01); *B64D 13/06* (2013.01); *F24F 13/0281* (2013.01); *B64D 2013/0603* (2013.01)

(58) Field of Classification Search
CPC .... F24F 13/02; F24F 13/0263; F24F 13/0281; F24F 13/24; F24F 2013/242; F16L 55/02; F16L 55/033; F16L 55/0336; F16L 55/0338; F16L 9/14; F16L 9/16; F16L 59/02; F16L 11/26; F16L 11/20;
(Continued)

(56) References Cited

U.S. PATENT DOCUMENTS 5,617,900 A * 4/1997 Weil ........................ F16L 59/00 138/110
6,622,818 B2 9/2003 Jenvey
(Continued)

*Primary Examiner* — Edgardo San Martin

(57) ABSTRACT

There is provided a self-muffling acoustic duct assembly for noise attenuation in a vehicle. The self-muffling acoustic duct assembly includes a duct with two or more reinforced thermoplastic composite laminate layers forming a duct structure and having a plurality of openings for noise to travel through. The duct includes a thermoplastic film sealing layer embedded between the reinforced thermoplastic composite laminate layers. The thermoplastic film sealing layer forms a barrier to prevent leakage of air from the duct and is transparent to the noise traveling through the duct. The self-muffling acoustic duct assembly further includes an insulation and noise attenuating layer coupled to, and covering, the duct structure, and a thermoplastic film outer layer coupled to the insulation and noise attenuating layer. The duct allows transmission of noise through the duct and into the insulation and noise attenuating layer, while avoiding use of separate zone mufflers.

20 Claims, 20 Drawing Sheets

(51) Int. Cl.

*B32B 3/26* (2006.01)
*B64D 13/06* (2006.01)
*F16L 9/14* (2006.01)
*F16L 55/02* (2006.01)
*F16L 55/033* (2006.01)
*F24F 13/24* (2006.01)

(58) Field of Classification Search

CPC .. F16L 11/14; F16L 11/16; B32B 1/08; B32B 3/26; B32B 3/266; B64D 13/06; B64D 2013/0603; G10K 11/168

See application file for complete search history.

(56) References Cited

U.S. PATENT DOCUMENTS 8,061,477 B2 * 11/2011 Patel ........................ F24F 13/24 181/224
8,371,338 B2 * 2/2013 Princell ................. F16L 59/147 138/131
8,393,436 B2 * 3/2013 Tomerlin .................. F01N 1/24 138/129
8,899,377 B2 12/2014 Thomas
9,976,687 B2 * 5/2018 Goulet ...................... B32B 5/26
10,591,104 B2 * 3/2020 Goulet .................. F01N 13/148
11,260,637 B2 * 3/2022 Kuwajima ............ B32B 27/322
11,712,872 B2 8/2023 Maben et al.
11,739,973 B2 8/2023 Vandyke et al.
11,867,344 B2 * 1/2024 Goulet ...................... B32B 7/12
12,013,071 B2 * 6/2024 Vandyke ............. F16L 55/0338
12,358,627 B2 * 7/2025 Bires ....................... B32B 5/262
2023/0010222 A1 1/2023 Vandyke et al.

* cited by examiner

SELF-MUFFLING ACOUSTIC DUCT ASSEMBLY FOR NOISE ATTENUATION IN A VEHICLE AND METHOD OF USING THE SAME

FIELD

The present disclosure relates generally to acoustic duct assemblies of an environmental control system in a vehicle, and more particularly to self-muffling acoustic duct assemblies of an environmental control system in a vehicle, such as an aircraft, that attenuate noise generated by airflow within the environmental control system.

BACKGROUND

Many types of vehicles, such as aircraft, spacecraft, rotorcraft, watercraft, automobiles, and other vehicles use environmental control systems to provide treated air, such as conditioned air or filtered air, to passengers and/or cargo. An environmental control system typically includes various ducts to flow the air through the vehicle. However, the airflow within such ducts generates noise, which can be undesirable, especially when such ducts are positioned close to, or inside, interior passenger cabins. Separate zone mufflers are often used to reduce or absorb the noise generated by the airflow. However, such separate zone mufflers may add weight, volume, and cost to environmental control systems. In high performance vehicles, such as aircraft, increased weight and volume may increase costs and may decrease performance.

Known noise attenuating duct designs for environmental control systems exist. For example, one such noise attenuating duct design uses an open weave thermoset composite material with a film layer laminated to it. However, resin from a thermoset composite prepreg material may block openings in the open weave and may not allow noise to escape from the open weave duct wall to a noise attenuating foam adjacent the open weave duct wall.

In addition, another known noise attenuating duct design uses an additive manufactured, i.e., 3D printed, grid for a duct structure with a film layer laminated to the grid. Such additive manufactured duct design allows transmission of noise from the grid to a noise attenuating foam adjacent the grid. However, such additive manufactured duct design is heavy due to the thick 3D printed gridwork and prototype parts are difficult to assemble. In high performance vehicles, such as aircraft, increased weight and volume may increase costs and may decrease performance.

Accordingly, there is a need in the art for an improved acoustic duct assembly and method for an environmental control system in a vehicle, having self-muffling capabilities that avoid the use of separate zone mufflers and provide self-muffling acoustic ducting having a reduced weight, a compact size and volume, a reduced part count, and a reduced cost to manufacture. In addition, it is desired to provide an improved acoustic duct assembly that allows for transmission of noise through the duct wall to an insulation and noise attenuating layer without a risk of delamination of a film sealing layer in the duct design, that prevents noise from escaping into air ducts in a passenger area in the vehicle, that does not require additive manufacturing to make, that is easy to assemble and produce, that has a lightweight construction, and that provides other advantages over known duct assemblies, systems, and methods.

SUMMARY

Example implementations of the present disclosure provide for an improved self-muffling acoustic duct assembly for noise attenuation in a vehicle, and a method of using one or more self-muffling acoustic duct assemblies to attenuate noise in a vehicle. As discussed in the below detailed description, versions of the improved self-muffling acoustic duct assembly and method may provide significant advantages over known assemblies, systems, and methods.

In a version of the disclosure, there is provided a self-muffling acoustic duct assembly for noise attenuation in a vehicle. The self-muffling acoustic duct assembly comprises a duct having a tube shape. The duct comprises two or more reinforced thermoplastic composite laminate layers forming a duct structure of the duct. The two or more reinforced thermoplastic composite laminate layers have a plurality of openings for noise to travel through the duct.

The duct further comprises a thermoplastic film sealing layer embedded between the two or more reinforced thermoplastic composite laminate layers. The thermoplastic film sealing layer forms a barrier to prevent leakage of air from the duct and is transparent to the noise traveling through the duct.

The self-muffling acoustic duct assembly further comprises an insulation and noise attenuating layer coupled to, and covering, the duct structure. The self-muffling acoustic duct assembly further comprises a thermoplastic film outer layer coupled to the insulation and noise attenuating layer.

The duct, the insulation and noise attenuating layer, and the thermoplastic film outer layer form the self-muffling acoustic duct assembly for noise attenuation in the vehicle. The duct allows transmission of the noise through the duct and into the insulation and noise attenuating layer where the noise is attenuated, while avoiding delamination of the thermoplastic film sealing layer in the duct, and while avoiding use of one or more separate zone mufflers in the duct.

In another version of the disclosure, there is provided an aircraft. The aircraft comprises an environmental control system. The environmental control system comprises an air conditioning unit and one or more self-muffling acoustic duct assemblies.

Each self-muffling acoustic duct assembly comprises a duct having a tube shape. The duct comprises two or more reinforced thermoplastic composite laminate layers forming a duct structure of the duct. The two or more reinforced thermoplastic composite laminate layers have a plurality of openings for noise to travel through the duct.

The duct further comprises a thermoplastic film sealing layer embedded between the two or more reinforced thermoplastic composite laminate layers. The thermoplastic film sealing layer forms a barrier to prevent leakage of air from the duct and is transparent to the noise traveling through the duct.

Each self-muffling acoustic duct assembly further comprises an insulation and noise attenuating layer coupled to, and covering, the duct structure. Each self-muffling acoustic duct assembly further comprises a thermoplastic film outer layer coupled to the insulation and noise attenuating layer.

Each self-muffling acoustic duct assembly provides noise attenuation in a cabin of the aircraft. The duct allows transmission of the noise through the duct and into the insulation and noise attenuating layer where the noise is attenuated, while avoiding delamination of the thermoplastic film sealing layer in the duct, and while avoiding use of one or more separate zone mufflers in the duct.

In another version of the disclosure, there is provided a method of using one or more self-muffling acoustic duct assemblies to attenuate noise in a vehicle. The method comprises the step of forming the one or more self-muffling acoustic duct assemblies.

Each of the one or more self-muffling acoustic duct assemblies comprises a duct having a tube shape. The duct comprises two or more reinforced thermoplastic composite laminate layers forming a duct structure of the duct. The two or more reinforced thermoplastic composite laminate layers have a plurality of openings for the noise to travel through the duct.

The duct further comprises a thermoplastic film sealing layer embedded between the two or more reinforced thermoplastic composite laminate layers. The thermoplastic film scaling layer forms a barrier to prevent leakage of air from the duct and is transparent to the noise traveling through the duct.

Each of the one or more self-muffling acoustic duct assemblies further comprises an insulation and noise attenuating layer coupled to, and covering, the duct structure. Each of the one or more self-muffling acoustic duct assemblies further comprises a thermoplastic film outer layer coupled to the insulation and noise attenuating layer.

The method further comprises the step of coupling the one or more self-muffling acoustic duct assemblies to an environmental control system in the vehicle. The method further comprises the step of using the one or more self-muffling acoustic duct assemblies to attenuate the noise in a passenger area of the vehicle, by allowing transmission of the noise through the duct and into the insulation and noise attenuating layer, while avoiding delamination of the thermoplastic film sealing layer in the duct, and while avoiding use of one or more separate zone mufflers.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2 is an illustration of a block diagram of exemplary versions of a self-muffling acoustic duct assembly of an environmental control system in a vehicle;

Figure 1:
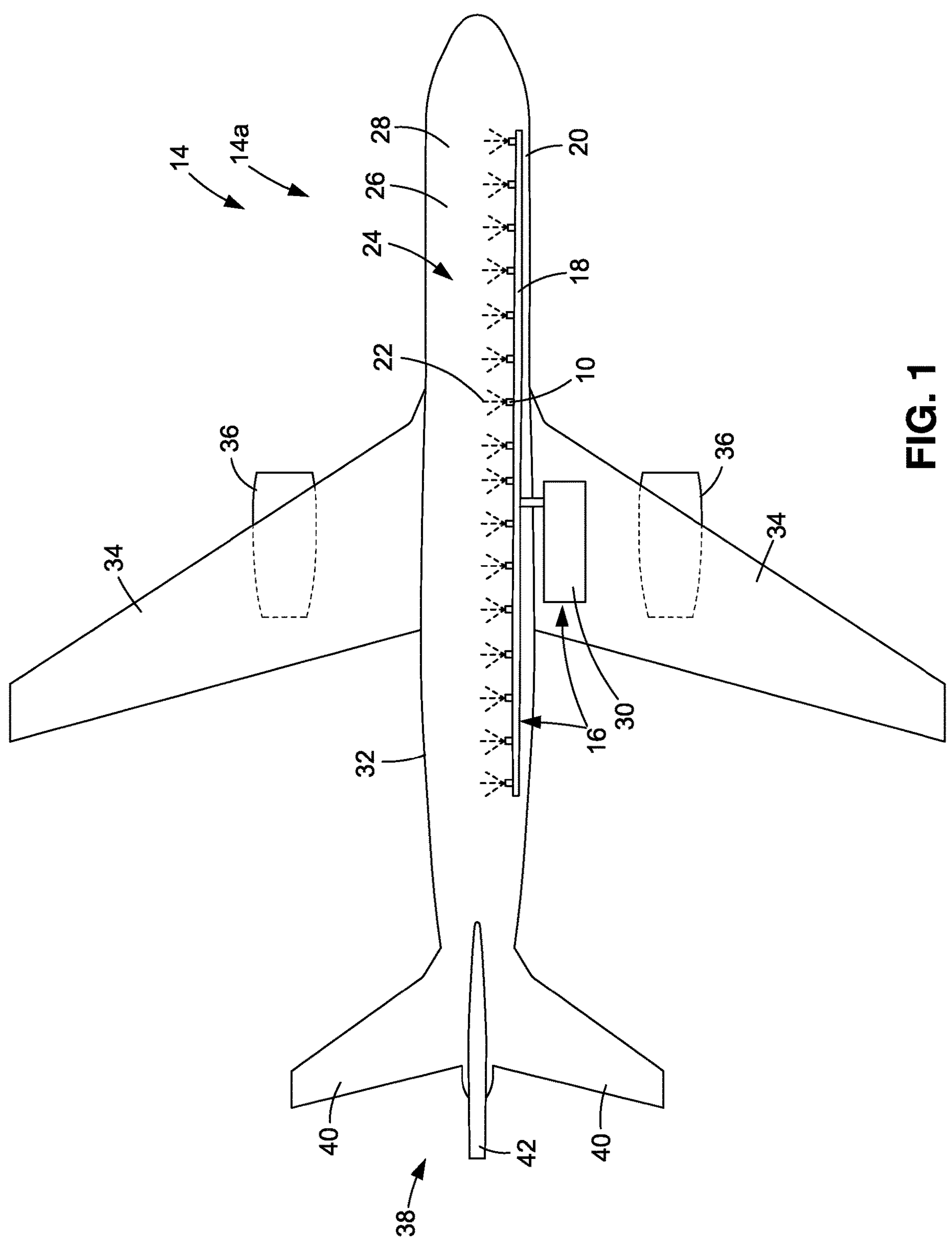
FIG. 1 is an illustration of a perspective view of an aircraft with an environmental control system incorporating a version of a self-muffling acoustic duct assembly of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

In exemplary versions as disclosed herein, there is provided a self-muffling acoustic duct assembly 10 (see FIG. 2) or self-muffling acoustic duct assemblies 10 (see FIG. 2) for noise attenuation 12 (see FIG. 2) in a vehicle 14 (see FIG. 1), such as an aircraft 14*a* (see FIG. 1). As used herein, the term "self-muffling acoustic duct" means an acoustic duct that has the capability of muffling, attenuating, or reducing noise or sound on its own in situ without having to use one or more separate zone mufflers or other dedicated muffler devices or mufflers.

Now referring to FIG. 1, FIG. 1 is an illustration of a perspective view of the vehicle 14, such as the aircraft 14*a*, with an environmental control system 16 incorporating a duct system 18 with self-muffling acoustic duct assemblies 10 of the disclosure. As shown in FIG. 1, the duct system 18 is located in, and extends along, a crown 20 of the aircraft 14*a*, to ensure a desired distribution of air 22 within a passenger area 24, such as the cabin 26, in an interior 28 of the vehicle 14, such as the aircraft 14*a*.

As shown in FIG. 1, the environmental control system 16 includes the duct system 18 and an air conditioning unit 30 in fluid communication with the duct system 18. The air conditioning unit 30 is configured to condition, filter, or treat the air 22 that flows within the environmental control system 16. The environmental control system 16 also includes other components (not shown) such as inlet ports, outlet ports, air vents, fans, and other suitable components.

As further shown in FIG. 1, the vehicle 14, such as the aircraft 14*a*, comprises the fuselage 32, wings 34, and engines 36. In addition, as shown in FIG. 1, the vehicle 14, such as the aircraft 14*a*, comprises a tail 38, including horizontal stabilizers 40 and a vertical stabilizer 42.

Although the aircraft 14*a* shown in FIG. 1 is generally representative of a commercial passenger aircraft, the teachings of the disclosed versions may be used with other passenger aircraft. For example, the teachings of the disclosed versions may be used with cargo aircraft, military aircraft, and other types of aircraft or aerial vehicles, as well as other vehicles 14, including spacecraft 14*b* (see FIG. 2), rotorcraft 14*c* (see FIG. 2), watercraft 14*d* (see FIG. 2), an automobile 14*c* (see FIG. 2), and other suitable vehicles.

Figure 2:
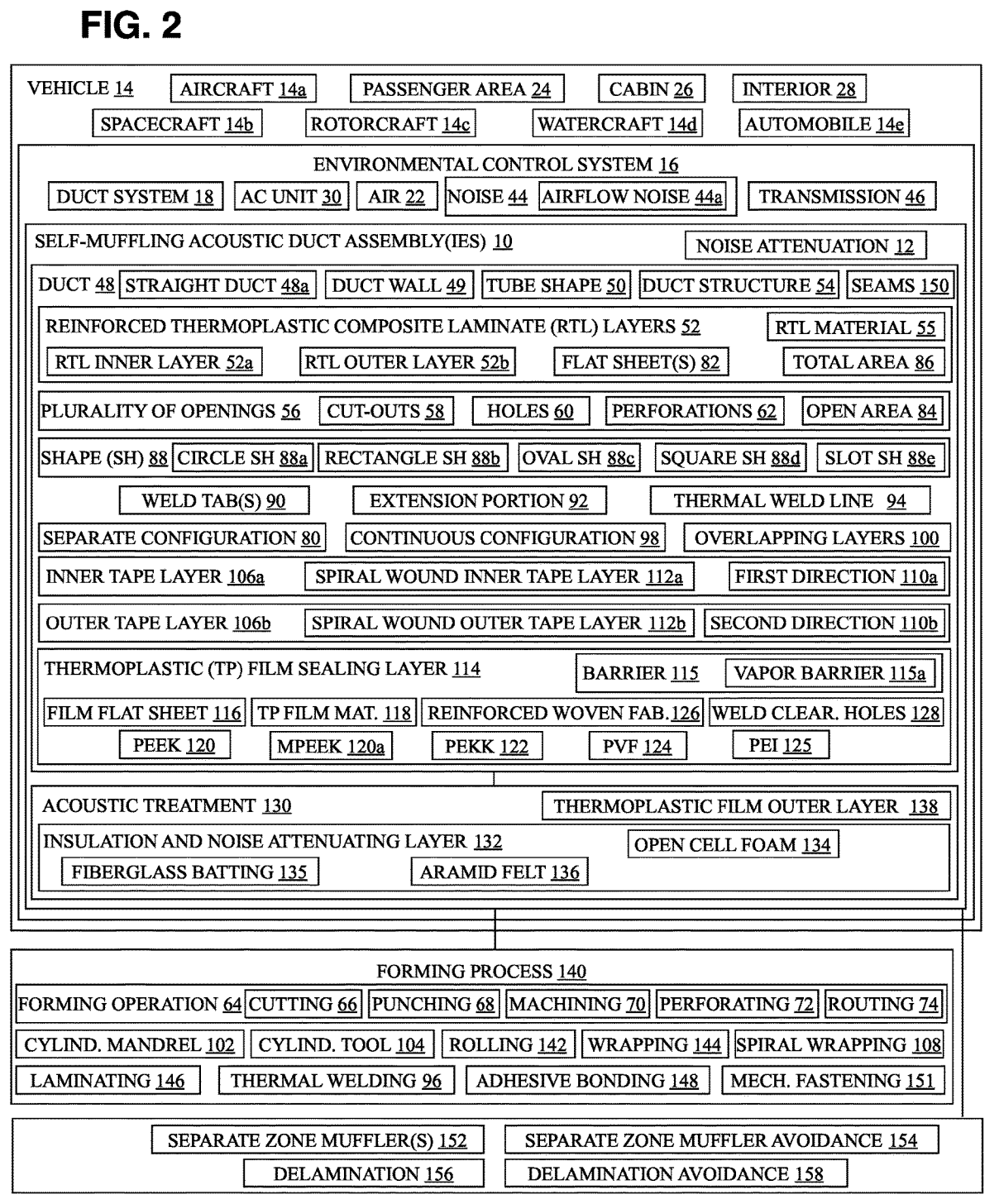

Now referring to FIG. 2, FIG. 2 is an illustration of a block diagram of exemplary versions of a self-muffling acoustic duct assembly 10 of an environmental control system 16 in a vehicle 14. The blocks in FIG. 2 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustration of the exemplary self-muffling acoustic duct assembly 10 in FIG. 2 is not meant to imply physical or architectural limitations to the manner in which an illustrative example may be implemented. Other components in addition to, or in place of, the ones illustrated may be used. Some components may be unnecessary.

As shown in FIG. 2, the vehicle 14 comprises an aircraft 14*a*, a spacecraft 14*b*, a rotorcraft 14*c*, a watercraft 14*d*, an automobile 14*c*, or another suitable vehicle. As further shown in FIG. 2, in a version of the aircraft 14*a*, the aircraft 14*a* includes the passenger area 24, such as the cabin 26, in the interior 28 of the aircraft 14*a*.

As further shown in FIG. 2, the vehicle 14 comprises the environmental control system 16 that includes the duct system 18 and the air conditioning unit 30, as well as various other components discussed above. Air 22 (see FIG. 2) flows through the duct system 18 of the environmental control system 16 and generates noise 44 (see FIG. 2), such as airflow noise 44*a* (see FIG. 2). Transmission 46 (see FIG. 2) of the noise 44, such as the airflow noise 44*a*, to the passenger area 24, such as the cabin 26, is undesirable The self-muffling acoustic duct assembly 10 (see FIG. 2) is designed to provide noise attenuation 12 (see FIG. 2), or noise reduction, of noise 44, or sound, such as airflow noise 44*a*, or airflow sound, generated by the air 22 flowing through the duct system 18.

As shown in FIG. 2, the self-muffling acoustic duct assembly 10 for providing noise attenuation 12 in the vehicle 14 comprises a duct 48 having a duct wall 49 and a tube shape 50. Preferably, the duct 48 is a straight duct 48*a* (see FIG. 2). As shown in FIG. 2, the duct 48 comprises two or more reinforced thermoplastic composite laminate (RTL) layers 52 forming a duct structure 54 of the duct 48.

Preferably, the reinforced thermoplastic composite laminate (RTL) layers 52 are made of a reinforced thermoplastic composite laminate (RTL) material 55 (see FIG. 2) having fibers comprising one or more of, carbon fiber, fiberglass, poly-praraphenylene terephthalamide fiber, or another suitable composite fiber. Preferably, the reinforced thermoplastic composite laminate (RTL) material 55 comprising the reinforced thermoplastic composite laminate (RTL) layers 52 is a reinforced thermoplastic composite material. In certain versions, the reinforced thermoplastic composite laminate material 55 may comprise a reinforced thermoset composite laminate material.

The two or more reinforced thermoplastic composite laminate layers 52 have a plurality of openings 56 configured for the noise 44 to travel through the duct 48. As shown in FIG. 2, the plurality of openings 56 may comprise cut-outs 58, holes 60, perforations 62, or other suitable openings formed via a forming operation 64 comprising one of, cutting 66, punching 68, machining 70, perforating 72, routing 74, or another suitable forming operation.

Figure 5A:
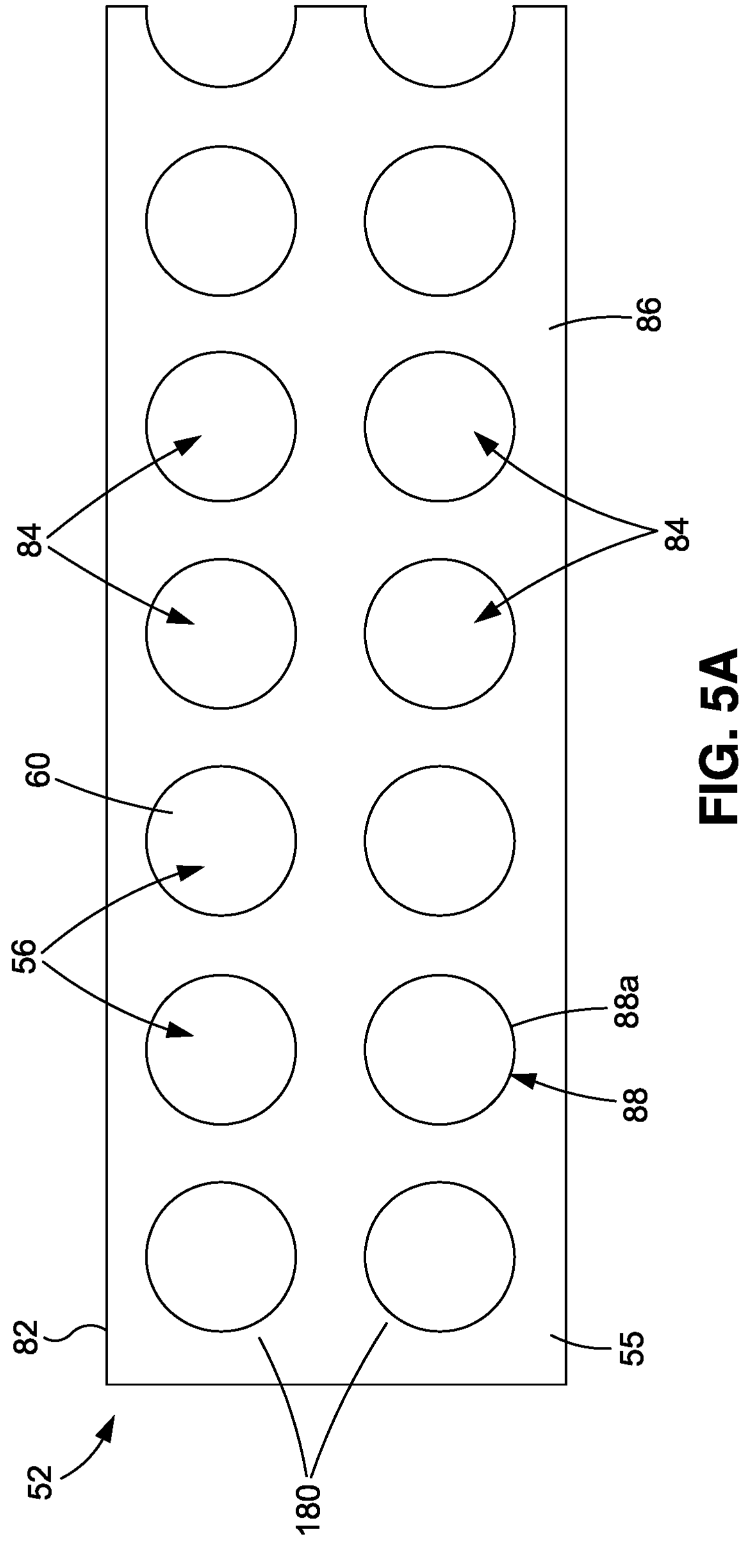
FIG. 5A is an illustration of a top view of an exemplary version of a flat sheet of a reinforced thermoplastic composite laminate layer with a plurality of openings that may be used in a version of a self-muffling acoustic duct assembly of the disclosure.
Figure 5B:
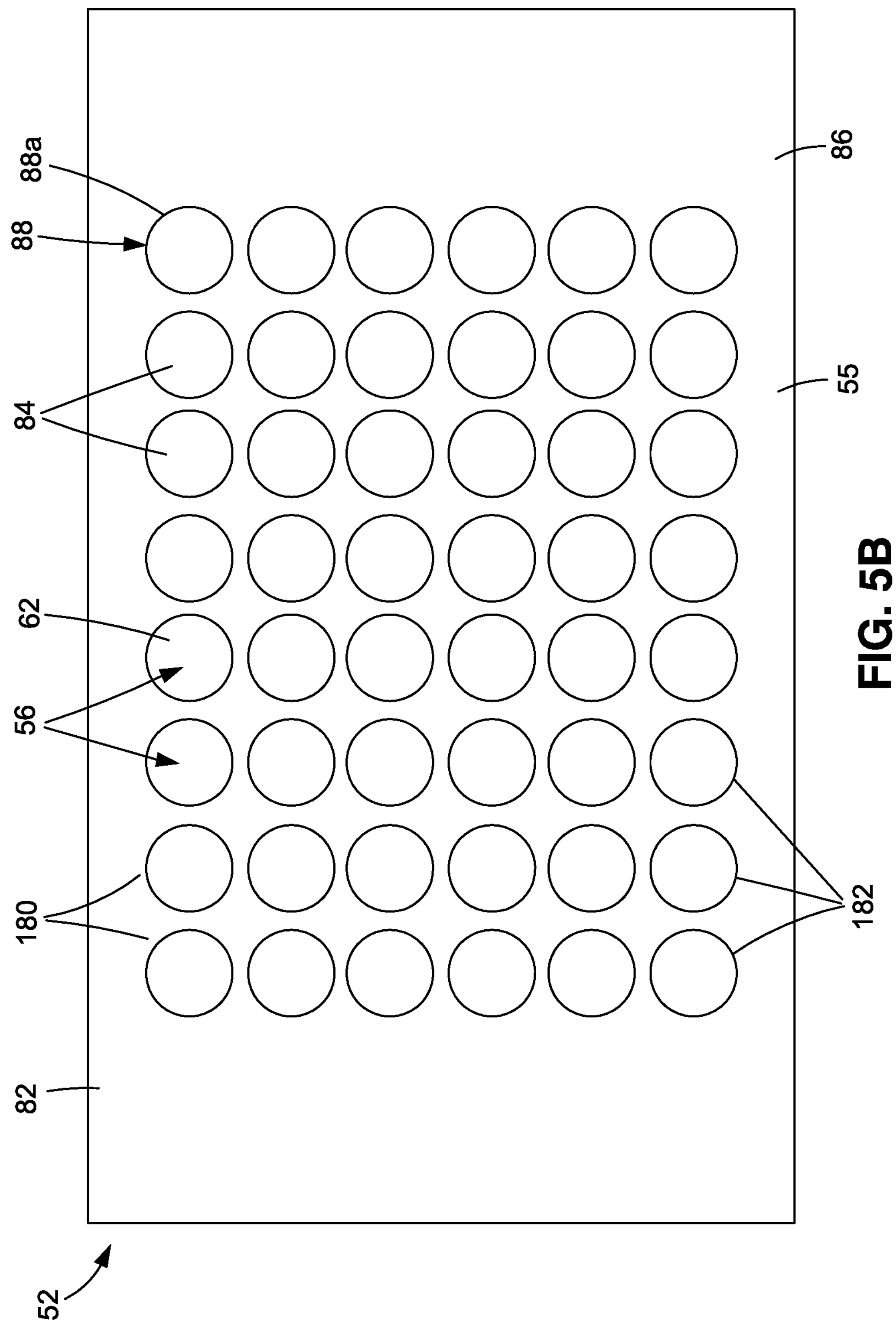
FIG. 5B is an illustration of a top view of another exemplary version of a flat sheet of a reinforced thermoplastic composite laminate layer with a plurality of openings that may be used in a version of a self-muffling acoustic duct assembly of the disclosure.
Figures 5C, 5D:
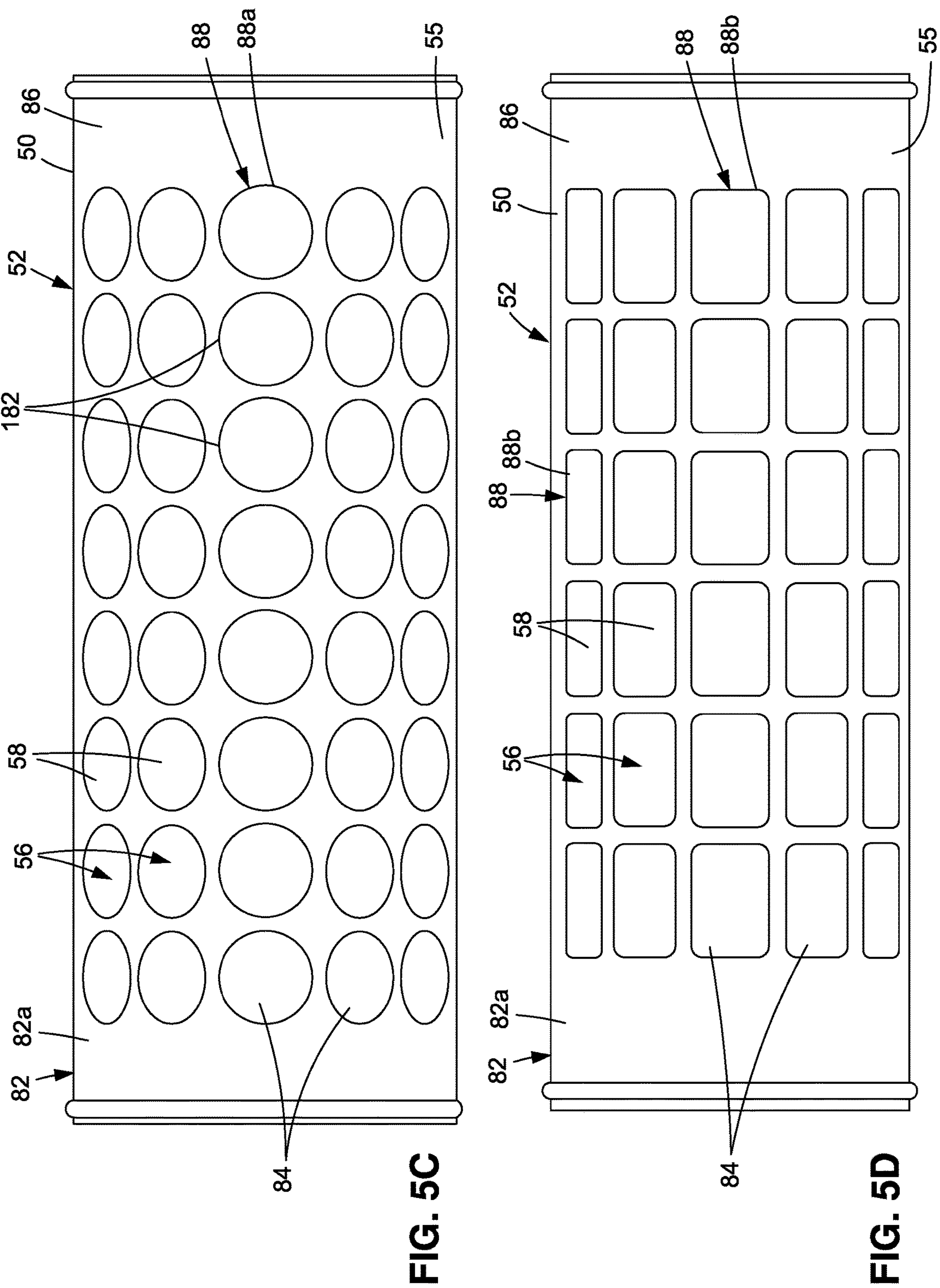
FIG. 5C is an illustration of a top view of an exemplary version of a rolled up flat sheet of a reinforced thermoplastic composite laminate layer with a plurality of openings that may be used in a version of a self-muffling acoustic duct assembly of the disclosure.
FIG. 5D is an illustration of a top view of another exemplary version of a rolled up flat sheet of a reinforced thermoplastic composite laminate layer with a plurality of openings that may be used in a version of a self-muffling acoustic duct assembly of the disclosure.
Figure 5E:
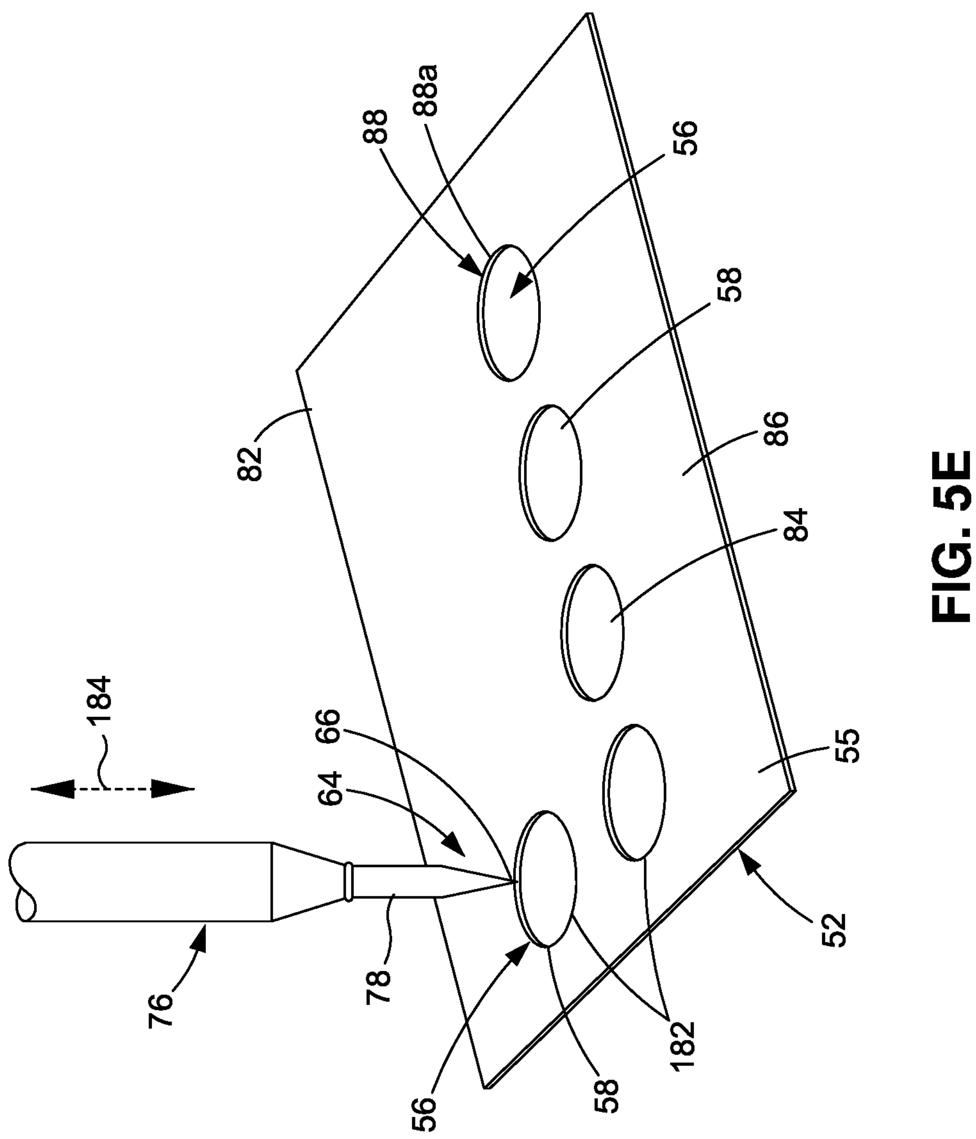
FIG. 5E is an illustration of a perspective view of an exemplary cutting apparatus used to cut a plurality of openings in a flat sheet of a reinforced thermoplastic composite laminate layer that may be used in a version of a self-muffling acoustic duct assembly of the disclosure.

As shown in FIG. 5E, in one version, the plurality of openings 56, cut-outs 58, holes 60, or perforations 62, may be formed by cutting 66 with a cutting apparatus 76, such as an ultrasonic knife 78. Alternatively, the plurality of openings 56, cut-outs 58, holes 60, or perforations 62, may be formed by cutting 66 with a ply cutter, a water jet cutter, or another suitable cutting apparatus. In other versions, the plurality of openings 56, such as cut-outs 58, holes 60, or perforations 62, may be formed by punching 68 the openings 56, cut-outs 58, holes 60, or perforations 62, such as manually hole punching the openings 56, cut-outs 58, holes 60, or perforations 62, or may be formed by machining 70 the openings 56, cut-outs 58, holes 60, or perforations 62, with a cutting machine, or may be formed by perforating 72 or routing 74 the openings 56, cut-outs 58, holes 60, or perforations 62, or may be formed by another suitable forming operation.

In one version, as shown in FIG. 2, the two or more reinforced thermoplastic composite laminate layers 52 are separate in a separate configuration 80 and comprise two reinforced thermoplastic composite laminate layers 52, for example, a reinforced thermoplastic composite laminate (RTL) inner layer 52*a* and a reinforced thermoplastic composite laminate (RTL) outer layer 52*b*. In this version, the two reinforced thermoplastic composite laminate layers 52 comprising the reinforced thermoplastic composite laminate inner layer 52*a* and the reinforced thermoplastic composite laminate outer layer 52*b*, may each comprise a flat sheet 82 with the plurality of openings 56 formed through the reinforced thermoplastic composite laminate layers 52, in the form of the flat sheets 82, where the plurality of openings 56 are formed via the forming operation 64 comprising one of, cutting 66, punching 68, machining 70, perforating 72, or routing 74 the plurality of openings 56. Preferably, the flat sheet 82 of the RTL material 55 comprises a 4 (four) inch by 8 (eight) inch flat sheet. However, other suitable sizes of the flat sheet 82 may be used.

Preferably, the plurality of openings 56, such as the cut-outs 58, holes 60, or perforations 62, in each of the two flat sheets 82 of the two reinforced thermoplastic composite laminate layers 52 are matched in size and aligned with each other.

Preferably, the plurality of openings 56, such as the cut-outs 58, holes 60, or perforations 62, of each of the flat sheets 82 of the two or more reinforced thermoplastic composite laminate layers 52 have an open area 84 (see FIG. 2), or a controlled porosity, in a range of 25% to 85% of a total area 86 (see FIG. 2) of each of the flat sheets 82 of the two or more reinforced thermoplastic composite laminate layers 52.

As further shown in FIG. 2, each of the plurality of openings 56, such as the cut-outs 58, holes 60, or perforations 62, has a shape (SH) 88 comprising one of, a circle shape (SH) 88*a*, a rectangle shape (SH) 88*b*, an oval shape (SH) 88*c*, a square shape (SH) 88*d*, a slot shape (SH) 88*e*, or another suitable shape. For the plurality of openings 56, such as the cut-outs 58, holes 60, or perforations 62 having the circle shape 88*a*, each circle shape 88*a* preferably has a diameter with a length in a range of 0.05 inch to 10 (ten) inches, and more preferably has a diameter with a length in a range of 0.05 inch to 6 (six) inches. However, the circle shape 88*a* may have a diameter with another suitable length. For the plurality of openings 56, such as the cut-outs 58, holes 60, or perforations 62 having the rectangle shape 88*b*, each rectangle shape 88*b* preferably has an edge length in a range of 0.05 inch to 10 (ten) inches, and more preferably has an edge length in a range of 0.05 inch to 6 (six) inches, and each rectangle shape 88*b* preferably has a width in a range of 0.05 inch to 10 (ten) inches, and more preferably has a width in a range of 0.05 inch to 6 (six) inches. However, the rectangle shape 88*b* may have another suitable edge length and another suitable width. For the plurality of openings 56, such as the cut-outs 58, holes 60, or perforations 62 having the oval shape 88*c*, each oval shape 88*c* preferably has a length in a range of 0.05 inch to 10 (ten) inches, and more preferably has a length in a range of 0.05 inch to 6 (six) inches, and each oval shape 88*c* preferably has a width in a range of 0.05 inch to 10 (ten) inches, and more preferably has a width in a range of 0.05 inch to 6 (six) inches. However, the oval shape 88*c* may have another suitable length and another suitable width. For the plurality of openings 56, such as the cut-outs 58, holes 60, or perforations 62 having the square shape 88*d*, each square shape 88*d* preferably has an edge length in a range of 0.05 inch to 10 (ten) inches, and more preferably has an edge length in a range of 0.05 inch to 6 (six) inches, and each square shape 88*d* preferably has a width in a range of 0.05 inch to 10 (ten) inches, and more preferably has a width in a range of 0.05 inch to 6 (six) inches. However, the square shape 88*d* may have another suitable length and another suitable width. For the plurality of openings 56, such as the cut-outs 58, holes 60, or perforations 62 having the slot shape 88*e*, each slot shape 88*e* preferably has a length in a range of 0.05 inch to 10 (ten) inches, and more preferably has a length in a range of 0.05 inch to 6 (six) inches, and each slot shape 88*e* preferably has a width in a range of 0.05 inch to 10 (ten) inches, and more preferably has a width in a range of 0.05 inch to 6 (six) inches. However, the slot shape 88*e* may have another suitable length and another suitable width.

As further shown in FIG. 2, the flat sheet 82 of at least one of the two or more reinforced thermoplastic composite laminate layers 52 has one or more weld tabs 90 (see also FIG. 6F) cut into the flat sheet 82 of at least one of the two or more reinforced thermoplastic composite laminate layers 52. The weld tabs 90 are discussed in further detail below with respect to FIG. 6F.

As further shown in FIG. 2, one of the reinforced thermoplastic composite laminate inner layer 52*a*, or the reinforced thermoplastic composite laminate outer layer 52*b*, may have an extension portion 92 (see also FIG. 7B) welded to the rest of the flat sheet 82 at a thermal weld line 94 (see also FIG. 7B) of the reinforced thermoplastic composite laminate inner layer 52*a*, or the reinforced thermoplastic composite laminate outer layer 52*b*, to provide added strength when thermal welding 96 one of the reinforced thermoplastic composite laminate inner layer 52*a*, or the reinforced thermoplastic composite laminate outer layer 52*b*. The extension portion 92 is discussed in further detail below with respect to FIG. 7B.

In another version, as shown in FIG. 2, the two or more reinforced thermoplastic composite laminate layers 52 are continuous in a continuous configuration 98 and are rolled up to form two or more overlapping layers 100. In this version, the two or more reinforced thermoplastic composite laminate layers 52 with the continuous configuration 98 may be formed from a single flat sheet 82 with the plurality of openings 56, such as the cut-outs 58, holes 60, or perforations 62, such that when the single flat sheet 82 is rolled up on a cylindrical (CYLIND.) mandrel 102 (see FIGS. 2, 8A), or a cylindrical (CYLIND.) tool 104 (see FIG. 2), it forms the two or more overlapping layers 100.

Figure 9:
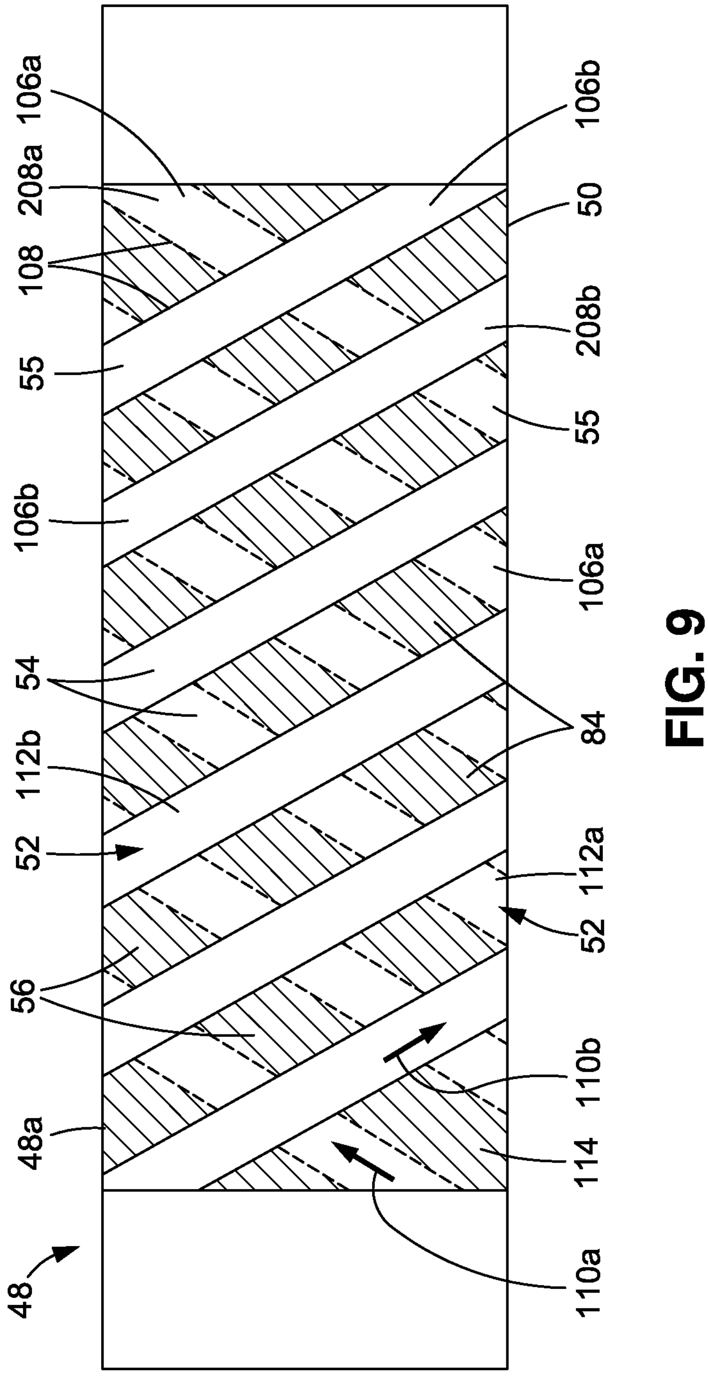
FIG. 9 is an illustration of a side view of an exemplary version of a duct of a self-muffling acoustic duct assembly of the disclosure, having a thermoplastic film sealing layer embedded between a spiral wound inner tape layer and a spiral wound outer tape layer.

In another version, as shown in FIGS. 2, 9, the two or more reinforced thermoplastic composite laminate layers 52 comprise an inner tape layer 106*a* and an outer tape layer 106*b*. The inner tape layer 106*a* undergoes a spiral wrapping 108, in a first direction 110*a* on the cylindrical mandrel 102, or the cylindrical tool 104, to form a spiral wound inner tape layer 112*a*. The outer tape layer 106*b* undergoes a spiral wrapping 108, in a second direction 110*b* opposite the first direction 110*a*, on the cylindrical mandrel 102, or the cylindrical tool 104, to form a spiral wound outer tape layer 112*b*. The plurality of openings 56 are provided or formed by spaces between the spiral wound inner tape layer 112*a* and the spiral wound outer tape layer 112*b*.

Preferably, the plurality of openings 56, of each of the spiral wound inner tape layer 112*a* and the spiral wound outer tape layer 112*b* have the open area 84, or the controlled porosity, in a range of 25% to 85% of the total area 86 of each of the spiral wound inner tape layer 112*a* and the spiral wound outer tape layer 112*b*.

As shown in FIG. 2, the self-muffling acoustic duct assembly 10 further comprises a thermoplastic (TP) film sealing layer 114 embedded between the two or more reinforced thermoplastic composite laminate layers 52. The thermoplastic film sealing layer 114 forms a barrier 115 (see FIG. 2), such as a vapor barrier 115*a* (see FIG. 2), to prevent leakage of air 22 from the duct 48, and the thermoplastic film sealing layer 114 is transparent to the noise 44 traveling through the duct 48, such as through the duct wall 49. The thermoplastic film sealing layer 114 is preferably a thin layer having a thickness in a range of ¼ (0.25) mil to 1 (one) mil. However, the thermoplastic film sealing layer 114 may have another suitable thickness. The thermoplastic film sealing layer 114 is substantially impermeable and has a maximum allowable duct leakage of 0.05 SCFM/sqft (standard cubic feet per minute per square foot) of surface area of 0.75 PSIG (pounds per square inch gauge) internal pressure.

The thermoplastic film sealing layer 114 is preferably in the form of a film flat sheet 116 of a thermoplastic (TP) film material (MAT.) 118 comprising one or more of, polyetheretherketone (PEEK) 120, metallized polyetheretherketone (MPEEK) 120*a*, polyetherketoneketone (PEKK) 122, polyvinyl fluoride (PVF) 124, polyetherimide (PEI) 125, or another suitable thermoplastic film material.

In one version, the thermoplastic film sealing layer 114 may have reinforced woven fabric 126 (see also FIG. 6I) included within the thermoplastic film sealing layer 114 to provide added strength and resistance to tearing.

In another version, the thermoplastic film sealing layer 114 may have a plurality of weld clearance (CLEAR.) holes 128 (see also FIG. 6F) formed through the thermoplastic film scaling layer 114, to enable thermal welding 96 (see FIG. 2) of the thermoplastic film scaling layer 114 directly to one or more of the two or more reinforced thermoplastic composite laminate layers 52.

In the version of the self-muffling acoustic duct assembly 10 where the reinforced thermoplastic composite laminate layers 52 comprise the spiral wound inner tape layer 112*a* (see FIG. 2) and the spiral wound outer tape layer 112*b* (see FIG. 2), the thermoplastic film sealing layer 114 is embedded or captured between the spiral wound inner tape layer 112*a* and the spiral wound outer tape layer 112*b*.

As shown in FIG. 2, the self-muffling acoustic duct assembly 10 further comprises an acoustic treatment 130 coupled to, and covering, an exterior surface of the duct structure 54 of the duct 48. As shown in FIG. 2, the acoustic treatment 130 comprises an insulation and noise attenuating layer 132. The insulation and noise attenuating layer 132 is coupled to, and covers, the exterior surface of the duct structure 54 and is coupled to, and covers an exterior side 165*a* (see FIG. 3) of the reinforced thermoplastic composite laminate outer layer 52*b*. The acoustic treatment 130 further comprises a thermoplastic (TP) film outer layer 138 (see FIG. 2). The thermoplastic film outer layer 138 is coupled to an exterior side 172*a* (see FIG. 3), or exterior surface, of the insulation and noise attenuating layer 132. The thermoplastic film outer layer 138 may be laminated to the insulation and noise attenuating layer 132. The thermoplastic film outer layer 138 is substantially impermeable and has a maximum allowable duct leakage of 0.05 SCFM/sqft (standard cubic feet per minute per square foot) of surface area of 0.75 PSIG (pounds per square inch gauge) internal pressure.

As shown in FIG. 2, the insulation and noise attenuating layer 132 comprises one of, an open cell foam 134, a fiberglass batting 135, or an aramid felt 136. The insulation and noise attenuating layer 132 may further comprise another suitable material.

The duct 48, the insulation and noise attenuating layer 132, and the thermoplastic film outer layer 138 form the self-muffling acoustic duct assembly 10 for noise attenuation 12 in the vehicle 14. The duct 48 allows transmission 46 (see FIG. 2) of the noise 44 through the duct 48 and into the insulation and noise attenuating layer 132, where the noise 44 is attenuated, while avoiding delamination 156 (see FIG. 2) of the thermoplastic film sealing layer 114 in the duct 48, and while avoiding use of one or more separate zone mufflers 152 (see FIG. 2) in the duct 48. The exemplary self-muffling acoustic duct assembly 10 is free of the separate zone mufflers 152, as the self-muffling acoustic duct assembly 10 is self-muffling and provides separate zone muffler avoidance 154 (see FIG. 2). The exemplary self-muffling acoustic duct assembly 10 is used in lieu of the separate zone mufflers 152 to reduce noise 44 introduced into the occupied areas, such as the passenger area 24, for example, the cabin 26, of the aircraft 14*a*. Any straight duct 48*a* (see FIG. 2) may use the self-muffling acoustic duct assembly design allowing greater muffling without increased cost, weight or space used in the volume of the aircraft 14*a*.

The process of noise attenuation 12 (see FIG. 2), or noise reduction, may comprise two versions. In one version, the insulation and noise attenuating layer 132 outside the thermoplastic film sealing layer 114 can attenuate noise 44 by passing through the thermoplastic film sealing layer 114, and the noise 44 is not able to break out through the thermoplastic film outer layer 138. In another version, the insulation and noise attenuating layer 132 outside the thermoplastic film sealing layer 114 can attenuate noise 44 by passing through the thermoplastic film sealing layer 114, and the noise 44 is able to break out through the thermoplastic film sealing layer 114. Some of the noise 44 is attenuated insulation and the noise attenuating layer 132 outside the thermoplastic film sealing layer 114. The remaining noise 44 passes through the insulation and noise attenuating layer 132 and through the thermoplastic film outer layer 138 into the surrounding environment around the duct 48 to be absorbed by surrounding systems and structures, for example, interior panels, fuselage insulation, and other types of surrounding systems and structures.

As further shown in FIG. 2, the self-muffling acoustic duct assembly 10 is formed or produced using a forming process 140. The forming process 140 comprises a forming operation 64 to form openings 56 in the flat sheets 82 of the each of the reinforced thermoplastic composite laminate layers 52. As shown in FIG. 2, the forming operation 64 for forming the openings 56 comprises one of, cutting 66, punching 68, machining 70, perforating 72, routing 74, or another suitable forming operation.

As further shown in FIG. 2, the forming process 140, in one version, comprises rolling 142 the reinforced thermoplastic composite laminate layers 52 and the thermoplastic film sealing layer 114 on a cylindrical (CYLIND.) mandrel 102, or a cylindrical (CYLIND.) tool 104, and laminating 146 one or more seams 150 (see FIG. 8B) together to fuse the reinforced thermoplastic composite laminate layers 52 and the thermoplastic film sealing layer 114 together. As shown in FIG. 2, the laminating 146 comprises thermal welding 96, adhesive bonding 148, or another suitable type of laminating. As further shown in FIG. 2, the thermoplastic film sealing layer 114 may be applied, or coupled, to the one or more of the reinforced thermoplastic composite laminate layers 52, such as the reinforced thermoplastic composite laminate inner layer 52*a* and/or the reinforced thermoplastic composite laminate outer layer 52*b*, via mechanical (MECH.) fastening 151 with one or more fasteners, such as screws, bolts, clips, clamps, or another suitable fastener.

As further shown in FIG. 2, the forming process 140, in another version, comprises spiral wrapping 108 the inner tape layer 106*a* and the outer tape layer 106*b* around the cylindrical mandrel 102, or the cylindrical tool 104, and wrapping 144 the thermoplastic film sealing layer 114 over the spiral wound inner tape layer 112*a*, so that in the final product, the thermoplastic film sealing layer 114 is captured or embedded between the spiral wound inner tape layer 112*a* and the spiral wound outer tape layer 112*b*.

FIG. 2 further shows the self-muffling acoustic duct assembly 10 provides separate zone muffler avoidance 154 and delamination avoidance 158. The sandwich design using the RTL/film/RTL configuration allows the noise 44 to escape through the thermoplastic film scaling layer 114, without the risk of delamination 156 of the thermoplastic film sealing layer 114, if the thermoplastic film sealing layer 114 is adhered on the second side 162 (see FIG. 3) of the reinforced thermoplastic composite laminate inner layer 52*a*, or without the risk of delaminating or rupturing if laminated to the first side 164 (see FIG. 3) of the reinforced thermoplastic composite laminate outer layer 52*b*. The thermoplastic film sealing layer 114 seals the duct 48, and the reinforced thermoplastic composite laminate (RTL) layers 52 provide sufficient rigidity and strength. The self-muffling acoustic duct assembly 10 may be used on positive pressure ducts or negative pressure ducts.

In another version of the disclosure, there is provided an aircraft 14*a* (see FIGS. 1, 2). The aircraft 14*a* comprises the environmental control system 16 with the air conditioning unit 30 (see FIGS. 1, 2) and one or more self-muffling acoustic duct assemblies 10 as disclosed herein.

Each self-muffling acoustic duct assembly 10, as discussed in detail above, comprises the duct 48 (see FIG. 2) having the tube shape 50 (see FIG. 2). The duct 48 comprises two or more reinforced thermoplastic composite laminate layers 52 (see FIG. 2) forming the duct structure 54 (see FIG. 2) of the duct 48. The two or more reinforced thermoplastic composite laminate layers 52 have a plurality of openings 56 (see FIG. 2) for noise 44 (see FIG. 2) to travel through the duct 48.

The duct 48 further comprises the thermoplastic film sealing layer 114 (see FIG. 2) embedded between the two or more reinforced thermoplastic composite laminate layers 52. The thermoplastic film sealing layer 114 forms a barrier 115 (see FIG. 2), such as a vapor barrier 115*a* (see FIG. 2), to prevent leakage of air 22 from the duct 48, and the thermoplastic film sealing layer 114 is transparent to the noise 44 traveling through the duct 48.

Each self-muffling acoustic duct assembly 10 further comprises the insulation and noise attenuating layer 132 (see FIG. 2) coupled to, and covering, the duct structure 54. Each self-muffling acoustic duct assembly 10 further comprises the thermoplastic film outer layer 138 (see FIG. 2) coupled to the insulation and noise attenuating layer 132.

Each self-muffling acoustic duct assembly 10 provides noise attenuation 12 in a cabin 26 (see FIGS. 1, 2) of the aircraft 14*a*. The duct 48 allows transmission 46 (see FIG. 2) of the noise 44 through the duct 48 and into the insulation and noise attenuating layer 132, where the noise 44 is attenuated, while avoiding delamination 156 (see FIG. 2) of the thermoplastic film sealing layer 114 in the duct 48, and while avoiding use of one or more separate zone mufflers 152 (see FIG. 2) in the duct 48.

In one version, the two or more reinforced thermoplastic composite laminate layers 52 each comprises a flat sheet 82 (see FIG. 2) with the plurality of openings 56 formed through the flat sheet 82, and the plurality of openings 56 have an open area 84 (see FIG. 2) in a range of 25% to 85% of a total area 86 (see FIG. 2) of the flat sheet 82.

In another version, the two or more reinforced thermoplastic composite laminate layers 52 comprise a spiral wound inner tape layer 112*a* (see FIG. 2) and a spiral wound outer tape layer 112*b* (see FIG. 2), such that the spiral wound inner tape layer 112*a* is wrapped in a first direction 110*a* (see FIG. 2) and the spiral wound outer tape layer 112*b* is wrapped in a second direction 110*b* (see FIG. 2) opposite the first direction 110*a*, to provide the plurality of openings 56. The thermoplastic film sealing layer 114 is embedded between the spiral wound inner tape layer 112*a* and the spiral wound outer tape layer 112*b*.

Figures 3, 4:
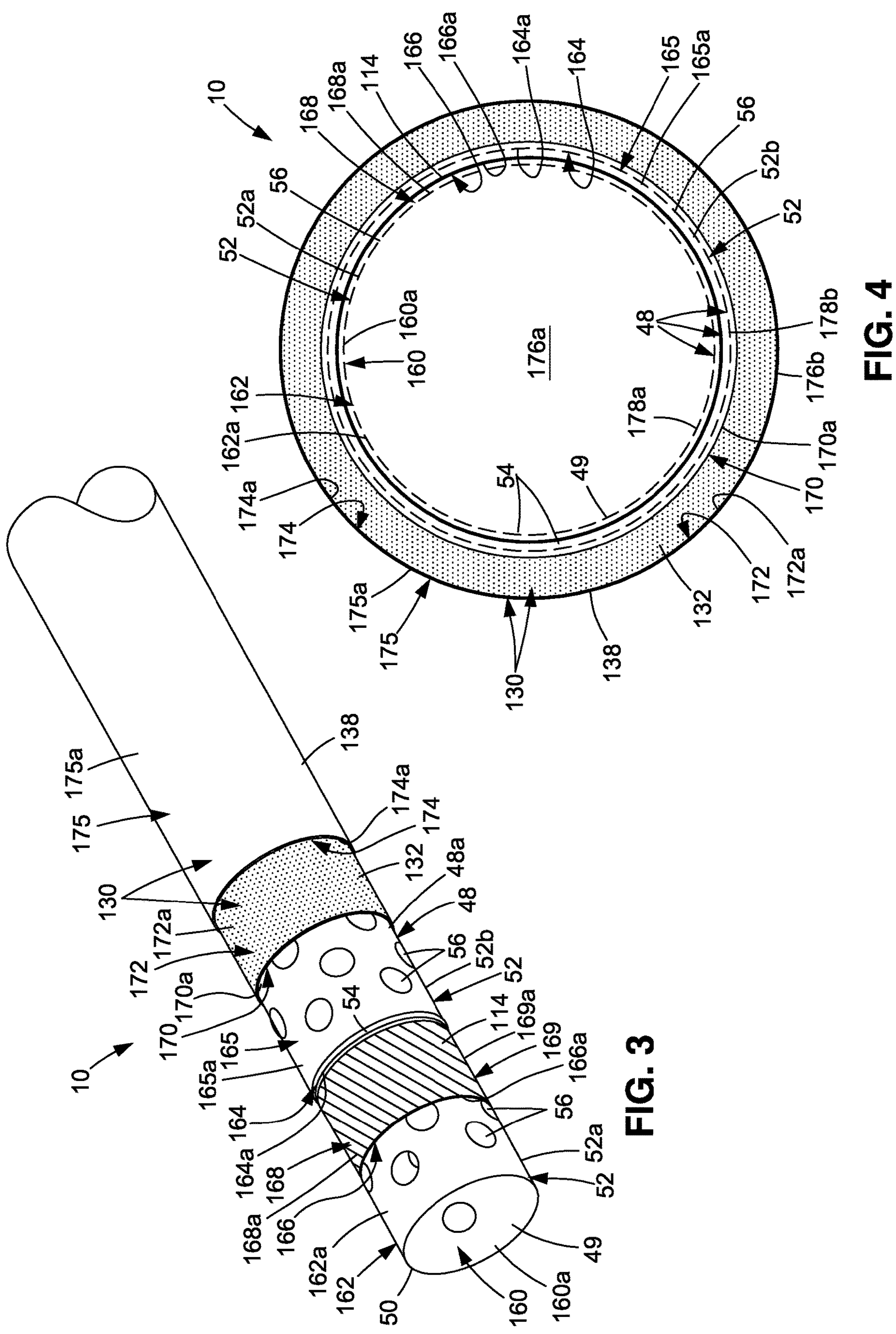
FIG. 3 is an illustration of a cut-away perspective view of an exemplary version of a self-muffling acoustic duct assembly of the disclosure.
FIG. 4 is an illustration of a cross-sectional view of an exemplary version of a self-muffling acoustic duct assembly of the disclosure.

Now referring to FIG. 3, FIG. 3 is an illustration of a cut-away perspective view of an exemplary version of the self-muffling acoustic duct assembly 10 of the disclosure. As shown in FIG. 3, in this version, the self-muffling acoustic duct assembly 10 comprises reinforced thermoplastic composite laminate layers 52, including the reinforced thermoplastic composite laminate inner layer 52*a* and the reinforced thermoplastic composite laminate outer layer 52*b*. Each of the reinforced thermoplastic composite laminate inner layer 52*a* and the reinforced thermoplastic composite laminate outer layer 52*b* have a plurality of openings 56. As shown in FIG. 3, the reinforced thermoplastic composite laminate inner layer 52*a* has a first side 160, such as an interior side 160*a*, and has a second side 162, such as an exterior side 162*a*. As further shown in FIG. 3, the reinforced thermoplastic composite laminate outer layer 52*b* has a first side 164, such as an interior side 164*a*, and has a second side 165, such as an exterior side 165*a*.

FIG. 3 further shows the thermoplastic film sealing layer 114 embedded between the reinforced thermoplastic composite laminate inner layer 52*a* and the reinforced thermoplastic composite laminate outer layer 52*b*. As shown in FIG. 3, the thermoplastic film sealing layer 114 has a first side 166, such as an interior side 166*a*, and has a second side 168, such as an exterior side 168*a*. As shown in FIG. 3, the first side 166, such as the interior side 166*a*, of the thermoplastic film sealing layer 114 is adjacent, or coupled to, the second side 162, such as the exterior side 162*a*, of the reinforced thermoplastic composite laminate inner layer 52*a*. As further shown in FIG. 3, the second side 168, such as the exterior side 168*a*, of the thermoplastic film sealing layer 114 is adjacent, or coupled, to the first side 164, such as the interior side 164*a*, of the reinforced thermoplastic composite laminate outer layer 52*b*. The thermoplastic film sealing layer 114 forms a pressure vessel 169 (see FIG. 3), such as an air containment pressure vessel 169*a*, to prevent leakage of air 22 (see FIGS. 1, 2) and other gaseous vapors out of the duct 48 (see FIG. 3).

FIG. 3 further shows the insulation and noise attenuating layer 132. As shown in FIG. 3, the insulation and noise attenuating layer 132 has a first side 170, such as an interior side 170*a*, and has a second side 172, such as an exterior side 172*a*. As shown in FIG. 3, the first side 170, such as the interior side 170*a*, of the insulation and noise attenuating layer 132 is adjacent, or coupled, to the second side 165, such as the exterior side 165*a*, of the reinforced thermoplastic composite laminate outer layer 52*b*.

FIG. 3 further shows the thermoplastic film outer layer 138. As shown in FIG. 3, the thermoplastic film outer layer 138 has a first side 174, such as an interior side 174*a*, and has a second side 175, such as an exterior side 175*a*. As shown in FIG. 3, the first side 174, such as the interior side 174*a*, of the thermoplastic film outer layer 138 is adjacent, or coupled, to the second side 172, such as the exterior side 172*a*, of the insulation and noise attenuating layer 132.

As further shown in FIG. 3, the insulation and noise attenuating layer 132 and the thermoplastic film outer layer 138 coupled, such as laminated, to the exterior side 172*a* of the insulation and noise attenuating layer 132, form the acoustic treatment 130.

FIG. 3 further shows the duct 48 comprising the thermoplastic film sealing layer 114 embedded or sandwiched between the reinforced thermoplastic composite laminate inner layer 52*a* and the reinforced thermoplastic composite laminate outer layer 52*b*, and shows the duct structure 54 comprising the reinforced thermoplastic composite laminate inner layer 52*a* and the reinforced thermoplastic composite laminate outer layer 52*b*. FIG. 3 further shows the duct 48 comprising a straight duct 48*a*, shows the duct wall 49 and shows the tube shape 50 of the duct 48.

The preferred version of the self-muffling acoustic duct assembly 10 has the duct 48 with an outside diameter with a length in a range of 0.5 inch to 15.0 (fifteen) inches; the insulation and noise attenuating layer 132 has a thickness in a range of 0.1 inch per side to 1.0 (one) inch per side; the duct 48 has a length in a range of 3.0 (three) inches to 168 (one hundred sixty-eight) inches; the duct 48 is a straight duct 48*a* with no bends; the openings 56 have a circle shape 88*a* (see FIG. 5A) when the flat sheet 82 or flat pattern is flat; the openings 56 having a circle shape 88*a* each have a minimum diameter (hole size) of 0.05 inch as measured in a flat sheet 82 or flat pattern, and the openings 56 having the circle shape 88*a*, each preferably have a diameter with a length in a range of 0.05 inch to 10 (ten) inches, and more preferably each have a diameter with a length in a range of 0.05 inch to 6 (six) inches; and the open area 84 (see FIG. 2) is in a range of 25% to 85% of the total area 86 (see FIG. 2) of each flat sheet 82.

Now referring to FIG. 4, FIG. 4 is an illustration of a cross-sectional view of an exemplary version of the self-muffling acoustic duct assembly 10 of the disclosure. As shown in FIG. 4, in this version, the self-muffling acoustic duct assembly 10 comprises the reinforced thermoplastic composite laminate layers 52, including the reinforced thermoplastic composite laminate inner layer 52*a* and the reinforced thermoplastic composite laminate outer layer 52*b*. Each of the reinforced thermoplastic composite laminate inner layer 52*a* and the reinforced thermoplastic composite laminate outer layer 52*b* have the plurality of openings 56. As shown in FIG. 4, the reinforced thermoplastic composite laminate inner layer 52*a* has the first side 160, such as the interior side 160*a*, and the second side 162, such as the exterior side 162*a*. As further shown in FIG. 4, the reinforced thermoplastic composite laminate outer layer 52*b* has the first side 164, such as the interior side 164*a*, and the second side 165, such as the exterior side 165*a*.

FIG. 4 further shows the thermoplastic film sealing layer 114 sandwiched between the reinforced thermoplastic composite laminate inner layer 52*a* and the reinforced thermoplastic composite laminate outer layer 52*b*. As shown in FIG. 4, the thermoplastic film sealing layer 114 has the first side 166, such as the interior side 166*a*, and has the second side 168, such as the exterior side 168*a*.

FIG. 4 further shows the insulation and noise attenuating layer 132 having the first side 170, such as the interior side 170*a*, and having the second side 172, such as the exterior side 172*a*. As shown in FIG. 4, the first side 170, such as the interior side 170*a*, of the insulation and noise attenuating layer 132 is adjacent, or coupled, to the second side 165, such as the exterior side 165*a*, of the reinforced thermoplastic composite laminate outer layer 52*b*.

FIG. 4 further shows the thermoplastic film outer layer 138 having the first side 174, such as the interior side 174*a*, and having the second side 175, such as the exterior side 175*a*. As shown in FIG. 4, the first side 174, such as the interior side 174*a*, of the thermoplastic film outer layer 138 is adjacent, or coupled, to the second side 172, such as the exterior side 172*a*, of the insulation and noise attenuating layer 132.

As further shown in FIG. 4, the insulation and noise attenuating layer 132 and the thermoplastic film outer layer 138 coupled, such as laminated, to the exterior side 172*a* of the insulation and noise attenuating layer 132, form the acoustic treatment 130.

FIG. 4 further shows an interior 176*a* and an exterior 176*b* of the self-muffling acoustic duct assembly 10, and shows an interior surface 178*a* and an exterior surface 178*b* of the duct 48. The duct 48 comprises the thermoplastic film sealing layer 114 sandwiched between the reinforced thermoplastic composite laminate inner layer 52*a* and the reinforced thermoplastic composite laminate outer layer 52*b*. The exterior surface 178*b* of the duct 48 is covered with the acoustic treatment 130, and in particular, the second side 165, such as the exterior side 165*a*, of the reinforced thermoplastic composite laminate outer layer 52*b* is covered by, and adjacent to, the first side 170, such as the interior side 170*a*, of the insulation and noise attenuating layer 132.

FIG. 4 further shows the duct structure 54 comprising the reinforced thermoplastic composite laminate inner layer 52*a* and the reinforced thermoplastic composite laminate outer layer 52*b*. FIG. 4 further shows the duct 48 comprising a straight duct 48*a* (see FIG. 3), and shows a duct wall 49 of the duct 48.

Now referring to FIGS. 5A-5E, FIGS. 5A-5E show various versions of the plurality of openings 56 formed in a reinforced thermoplastic composite laminate layer 52. FIG. 5A is an illustration of a top view of an exemplary version of a flat sheet 82 of a reinforced thermoplastic composite laminate (RTL) layer 52 of a reinforced thermoplastic composite laminate (RTL) material 55 with a plurality of openings 56 that may be used in a version of the self-muffling acoustic duct assembly 10 (see FIGS. 2-4) of the disclosure. FIG. 5A shows the open area 84, such as a range of 25% to 85% open area 84, or controlled porosity, of the plurality of openings 56, based on the total area 86 of the reinforced thermoplastic composite laminate layer 52. FIG. 5A further shows a flat pattern 180 of the plurality of openings 56 formed through the reinforced thermoplastic composite laminate layer 52. The openings 56, such as in the form of holes 60, shown in FIG. 5A, each have a shape 88 comprising a circle shape 88*a*.

FIG. 5B is an illustration of a top view of another exemplary version of a flat sheet 82 of a reinforced thermoplastic composite laminate (RTL) layer 52 of a reinforced thermoplastic composite laminate (RTL) material 55 with the plurality of openings 56 that may be used in a version of the self-muffling acoustic duct assembly 10 (see FIGS. 2-4) of the disclosure. FIG. 5B shows the open area 84, or controlled porosity, of the plurality of openings 56, which is a percentage or amount that is open based on the total area 86 of the reinforced thermoplastic composite laminate layer 52. FIG. 5B further shows the flat pattern 180 of the plurality of openings 56 formed through the reinforced thermoplastic composite laminate layer 52. The openings 56, such as in the form of perforations 62, shown in FIG. 5B, each have the shape 88 comprising the circle shape 88*a*. As shown in FIG. 5B, in this version, the shape 88 of all of the openings 56 is the same or identical, and the openings 56 are all of a uniform size 182. In other versions, the shape 88 and size of the openings 56 may be varied, with some openings 56 being the same shape and size, or with some, or all, of the openings 56 being different shapes and sizes.

FIG. 5C is an illustration of a top view of an exemplary version of a flat sheet 82, such as a rolled up flat sheet 82*a*, rolled into a tube shape 50 of a reinforced thermoplastic composite laminate (RTL) layer 52 of a reinforced thermoplastic composite laminate (RTL) material 55 with a plurality of openings 56 that may be used in a version of the self-muffling acoustic duct assembly 10 (see FIGS. 2-4) of the disclosure. FIG. 5C shows the open area 84, or controlled porosity, of the plurality of openings 56, which is a percentage or amount that is open based on the total area 86 of the reinforced thermoplastic composite laminate layer 52. FIG. 5C further shows the openings 56, such as in the form of cut-outs 58, having shapes 88 comprising the circle shape 88*a*. As shown in FIG. 5C, in this version, the openings 56 are all of a uniform size 182, and the shape 88 of the openings 56, such as the cut-outs 58, is uniform and the flat sheet 82 of FIG. 5B has been rolled into the rolled up flat sheet 82*a* with the tube shape 50.

FIG. 5D is an illustration of a top view of another exemplary version of a flat sheet 82, such as a rolled up flat sheet 82*a*, rolled into the tube shape 50 of a reinforced thermoplastic composite laminate (RTL) layer 52 of a reinforced thermoplastic composite laminate (RTL) material 55 with a plurality of openings 56 that may be used in a version of the self-muffling acoustic duct assembly 10 (see FIGS. 2-4) of the disclosure. FIG. 5D shows the open area 84, or controlled porosity, of the plurality of openings 56, which is a percentage or amount that is open based on the total area 86 of the reinforced thermoplastic composite laminate layer 52. FIG. 5D further shows the openings 56, such as in the form of cut-outs 58, having shapes 88 comprising a rectangle shape 88*b*. As shown in FIG. 5D, in this version, the shape 88 each of the openings 56, such as the cut-outs 58, is uniform.

FIG. 5E is an illustration of a perspective view of an exemplary cutting apparatus 76, in the form of an ultrasonic knife 78, that may be used to cut a plurality of openings 56, such as cut-outs 58, in a flat sheet 82 of a reinforced thermoplastic composite laminate (RTL) material 55 to form a reinforced thermoplastic composite laminate (RTL) layer 52 with openings 56 that may be used in a version of the self-muffling acoustic duct assembly 10 (see FIGS. 2-4) of the disclosure. If the self-muffling acoustic duct assembly 10 is formed with the two or more reinforced thermoplastic composite laminate layers 52, such as the reinforced thermoplastic composite laminate inner layer 52*a* and the reinforced thermoplastic composite laminate outer layer 52*b*, rather than the spiral wound inner tape layer 112*a* and the spiral wound outer tape layer 112*b*, the initial step of the forming process 140 (see FIG. 2) of forming the self-muffling acoustic duct assembly 10 is to form openings 56 (see FIGS. 2, 5E), such as cut-outs 58 (see FIGS. 2, 5E), holes 60 (see FIG. 2), perforations 62 (see FIG. 2), or other suitable openings, in and through the flat sheets 82 of the reinforced thermoplastic composite laminate (RTL) material 55 to form the reinforced thermoplastic composite laminate (RTL) layers 52 with the openings 56. Preferably, the openings 56, such as the cut-outs 58, formed in the flat sheets 82 for the reinforced thermoplastic composite laminate inner layer 52*a* and the reinforced thermoplastic composite laminate outer layer 52*b* are the same size and shape and aligned with each other when assembled into the duct 48. As shown in FIG. 2, the openings 56 are formed with the forming operation 64 comprising one of, cutting 66, punching 68, machining 70, perforating 72, routing 74, or another suitable forming operation to form the openings 56.

FIG. 5E shows the cutting apparatus 76, in the form of the ultrasonic knife 78, performing the forming operation 64, such as cutting 66, to form the openings 56, such as the cut-outs 58. The cutting apparatus 76, in the form of the ultrasonic knife 78, is configured to move in an up-and-down direction 184 (see FIG. 5E) to cut and form the openings 56 in and through the flat sheet 82 of the reinforced thermoplastic composite laminate (RTL) material 55. FIG. 5E shows the open area 84, or controlled porosity, of the plurality of openings 56, which is a percentage or amount that is open based on the total area 86 of the reinforced thermoplastic composite laminate layer 52. FIG. 5E further shows the openings 56, such as in the form of cut-outs 58, having shapes 88 comprising the circle shape 88*a*. As shown in FIG. 5E, in this version, the shape 88 of the openings 56, such as the cut-outs 58, is the same or identical, and the openings 56 have a uniform size 182.

Now referring to FIGS. 6A-6H, FIGS. 6A-6H show various versions of the thermoplastic film sealing layer 114 in the form of a film flat sheet 116, and also show the thermoplastic film sealing layer 114 applied to a reinforced thermoplastic composite laminate layer 52, such as a reinforced thermoplastic composite laminate inner layer 52*a*.

Figures 6A, 6B:
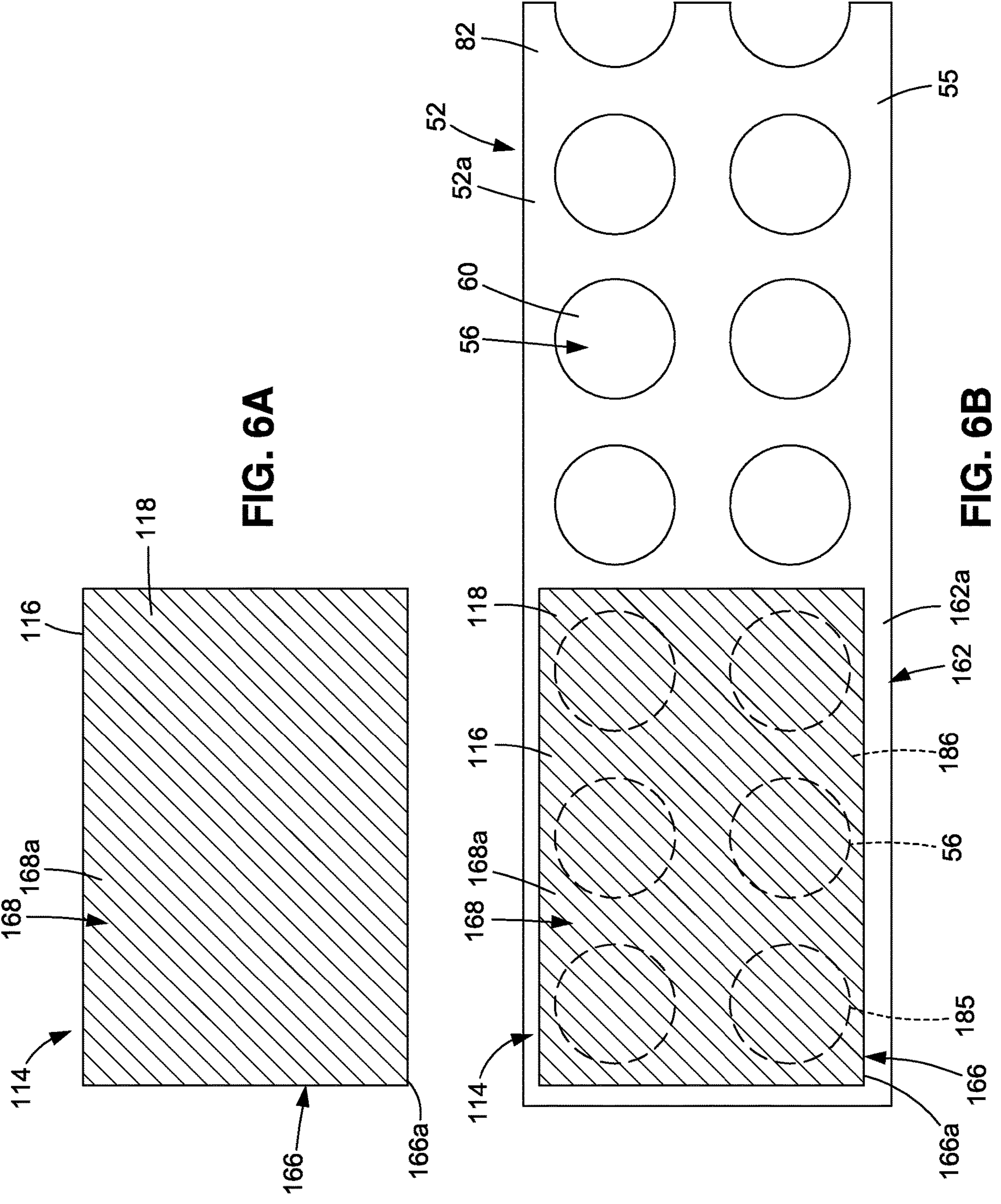
FIG. 6A is an illustration of a top view of an exemplary version of a thermoplastic film sealing layer that may be used in a version of a self-muffling acoustic duct assembly of the disclosure.
FIG. 6B is an illustration of a top view of the thermoplastic film sealing layer of FIG. 6A coupled over a portion of the openings of the flat sheet of the reinforced thermoplastic composite laminate layer of FIG. 5A.

FIG. 6A is an illustration of a top view of an exemplary version of the thermoplastic film sealing layer 114 in the form of the film flat sheet 116 of a thermoplastic film material 118, where the thermoplastic film sealing layer 114 may be used in a version of the self-muffling acoustic duct assembly 10 (see FIGS. 2-4) of the disclosure. As discussed above, and shown in FIG. 2, the thermoplastic film material 118 preferably comprises one or more of, polyetheretherketone (PEEK) 120, metallized polyetheretherketone (MPEEK) 120*a*, polyetherketoneketone (PEKK) 122, polyvinyl fluoride (PVF) 124, polyetherimide (PEI) 125, or another suitable thermoplastic film material. As shown in FIG. 6A, the thermoplastic film sealing layer 114 in the form of the film flat sheet 116 has the first side 166, such as the interior side 166*a*, and the second side 168, such as the exterior side 168*a*.

FIG. 6B is an illustration of a top view of the thermoplastic film sealing layer 114 of FIG. 6A in the form of the film flat sheet 116 of the thermoplastic film material 118 coupled over a portion 185 of the openings 56 and a portion 186 of the flat sheet 82 of the reinforced thermoplastic composite laminate (RTL) layer 52 of the reinforced thermoplastic composite laminate (RTL) material 55, of FIG. 5A. FIG. 6B shows the openings 56 in the form of holes 60, and shows the first side 166, such as the interior side 166*a*, and the second side 168, such as the exterior side 168*a*, of the thermoplastic film sealing layer 114 in the form of the film flat sheet 116.

FIG. 6B further shows the first side 166, such as the interior side 166*a*, of the thermoplastic film sealing layer 114 applied over the portion 186 of the second side 162, such as the exterior side 162*a*, of the reinforced thermoplastic composite laminate (RTL) layer 52, such as the reinforced thermoplastic composite laminate (RTL) inner layer 52*a*, and over the portion 185 of the openings 56.

In this step of the forming process 140 (see FIG. 2) of forming the self-muffling acoustic duct assembly 10, the thermoplastic film sealing layer 114 may be applied to the portion 186 of the second side 162, such as the exterior side 162*a*, of the reinforced thermoplastic composite laminate (RTL) layer 52, such as the reinforced thermoplastic composite laminate (RTL) inner layer 52*a*, by laminating 146 (see FIG. 2) or lamination, thermal welding 96 (see FIG. 2), adhesive bonding 148 (see FIG. 2), mechanical fastening 151 (see FIG. 2) with one or more fasteners, or another suitable coupling or attachment operation. For the version of the self-muffling acoustic duct assembly 10, such as shown in FIG. 9, where the duct 48 comprises the thermoplastic film sealing layer 114 captured or embedded between the spiral wound inner tape layer 112*a* and the spiral wound outer tape layer 112*b*, the thermoplastic film sealing layer 114 does not need to be coupled or attached via laminating 146, thermal welding 96, adhesive bonding 148, mechanical fastening 151, or another attachment means, as the thermoplastic film sealing layer 114 is physically trapped within and between the spiral wound inner tape layer 112*a* and the spiral wound outer tape layer 112*b* of the reinforced thermoplastic composite laminate (RTL) spiral.

Figure 6C:
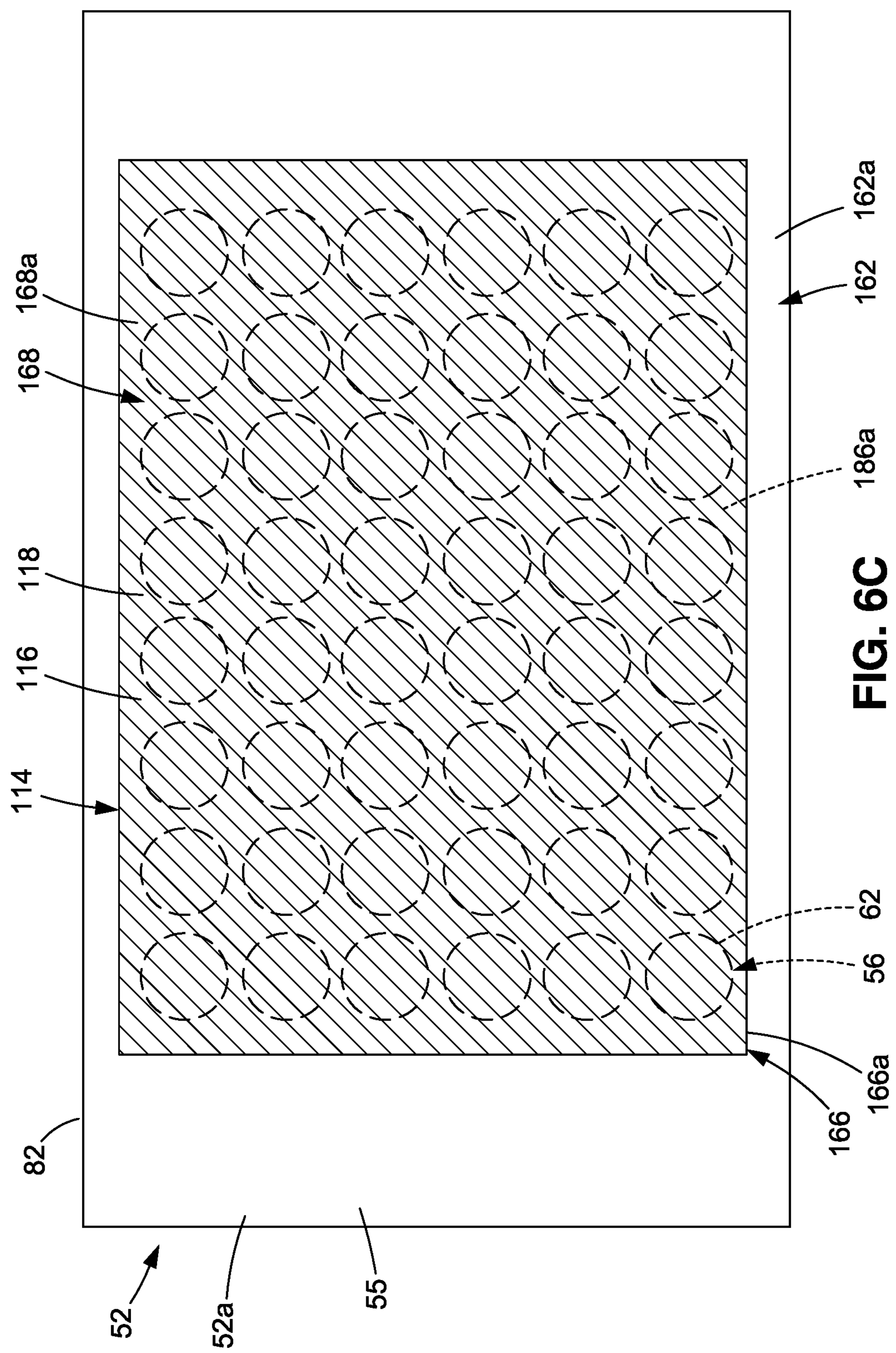
FIG. 6C is an illustration of a top view of a thermoplastic film sealing layer coupled over all of the openings of the flat sheet of the reinforced thermoplastic composite laminate layer of FIG. 5B.

FIG. 6C is an illustration of a top view of a thermoplastic film sealing layer 114 in the form of a film flat sheet 116 of the thermoplastic film material 118 coupled over all of the openings 56, and coupled over a portion 186*a* of the flat sheet 82 of the reinforced thermoplastic composite laminate layer 52 of the reinforced thermoplastic composite laminate (RTL) material 55, of FIG. 5B. FIG. 6C shows the openings 56 in the form of perforations 62, and shows the first side 166, such as the interior side 166*a*, and the second side 168, such as the exterior side 168*a*, of the thermoplastic film sealing layer 114 in the form of the film flat sheet 116.

FIG. 6C further shows the first side 166, such as the interior side 166*a*, of the thermoplastic film sealing layer 114 applied over the portion 186*a* of the second side 162, such as the exterior side 162*a*, of the reinforced thermoplastic composite laminate (RTL) layer 52, such as the reinforced thermoplastic composite laminate (RTL) inner layer 52*a*, and over the openings 56.

In this step of the forming process 140 (see FIG. 2) of forming the self-muffling acoustic duct assembly 10, the thermoplastic film sealing layer 114 may be applied to the portion 186*a* of the second side 162, such as the exterior side 162*a*, of the reinforced thermoplastic composite laminate (RTL) layer 52, such as the reinforced thermoplastic composite laminate (RTL) inner layer 52*a*, by laminating 146 (see FIG. 2) or lamination, thermal welding 96 (see FIG. 2), adhesive bonding 148 (see FIG. 2), mechanical fastening 151 (see FIG. 2) with one or more fasteners, or another suitable coupling or attachment operation.

Figures 6D, 6E:
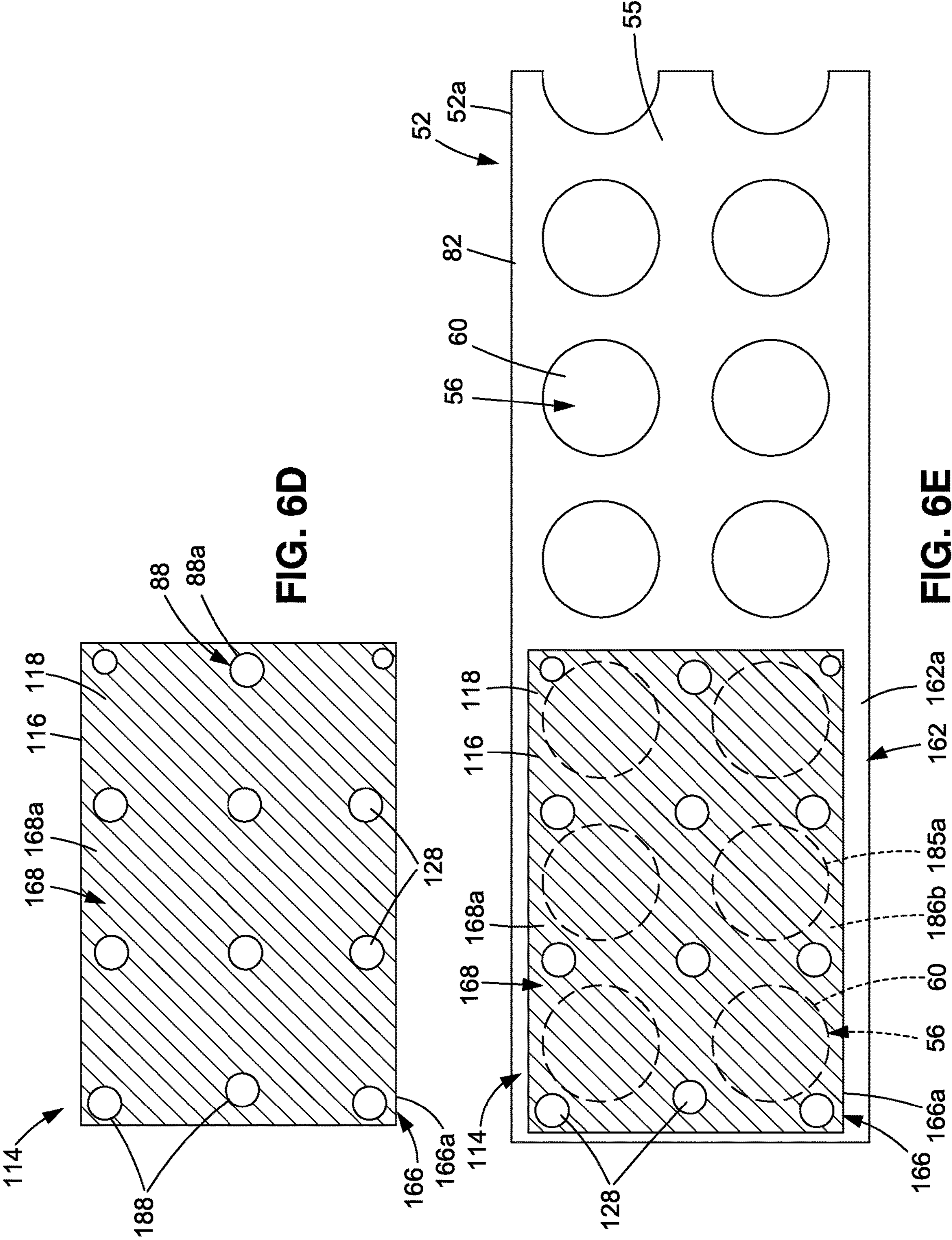
FIG. 6D is an illustration of a top view of another exemplary version of a thermoplastic film sealing layer having weld clearance holes that may be used in a version of a self-muffling acoustic duct assembly of the disclosure.
FIG. 6E is an illustration of a top view of the thermoplastic film sealing layer of FIG. 6D coupled over a portion of the openings of the flat sheet of the reinforced thermoplastic composite laminate layer of FIG. 5A.

FIG. 6D is an illustration of a top view of another exemplary version of a thermoplastic film sealing layer 114 in the form of the film flat sheet 116 of the thermoplastic film material 118 and having a plurality of weld clearance holes 128, where the thermoplastic film sealing layer 114 with the weld clearance holes 128 may be used in a version of the self-muffling acoustic duct assembly 10 (see FIGS. 2-4) of the disclosure. As shown in FIG. 6D, the thermoplastic film sealing layer 114 in the form of the film flat sheet 116 with the weld clearance holes 128 has the first side 166, such as the interior side 166*a*, and the second side 168, such as the exterior side 168*a*. As shown in FIG. 6D, in this version, the weld clearance holes 128 each have a shape 88, such as a circle shape 88*a*, and are formed through the thermoplastic film sealing layer 114 in a pattern 188, where the weld clearance holes 128 are evenly spaced apart in parallel rows. In other versions, the weld clearance holes 128 may be formed through the thermoplastic film sealing layer 114 in a different pattern or arrangement.

FIG. 6E is an illustration of a top view of the thermoplastic film sealing layer 114 in the form of the film flat sheet 116 of the thermoplastic film material 118 with the weld clearance holes 128, of FIG. 6D, coupled over a portion 185*a* of the openings 56, such as the holes 60, and a portion 186*b* of the flat sheet 82 of the reinforced thermoplastic composite laminate (RTL) layer 52 of the reinforced thermoplastic composite laminate (RTL) material 55, of FIG. 5A. FIG. 6C shows the openings 56 in the form of holes 60, and shows the first side 166, such as the interior side 166*a*, and the second side 168, such as the exterior side 168*a*, of the thermoplastic film sealing layer 114 in the form of the film flat sheet 116 with the weld clearance holes 128.

FIG. 6E further shows the first side 166, such as the interior side 166*a*, of the thermoplastic film sealing layer 114 applied over the portion 186*b* of the second side 162, such as the exterior side 162*a*, of the reinforced thermoplastic composite laminate (RTL) layer 52, such as the reinforced thermoplastic composite laminate (RTL) inner layer 52*a*, and over the portion 185*a* of the openings 56. In this step of the forming process 140 (see FIG. 2) of forming the self-muffling acoustic duct assembly 10, the thermoplastic film sealing layer 114 with the weld clearance holes 128 may be applied to the portion 186*b* of the second side 162, such as the exterior side 162*a*, of the reinforced thermoplastic composite laminate (RTL) layer 52, such as the reinforced thermoplastic composite laminate (RTL) inner layer 52*a*, by thermal welding 96 (see FIG. 2). The weld clearance holes 128 formed in the thermoplastic film sealing layer 114 enable and facilitate the thermoplastic film sealing layer 114 to be thermally welded, via thermal welding 96, directly to the reinforced thermoplastic composite laminate (RTL) layer 52, such as the reinforced thermoplastic composite laminate (RTL) inner layer 52*a*, in case the thermoplastic film scaling layer 114 does not have sufficient thermal weld properties.

Figures 6F, 6G, 6H, 6I:
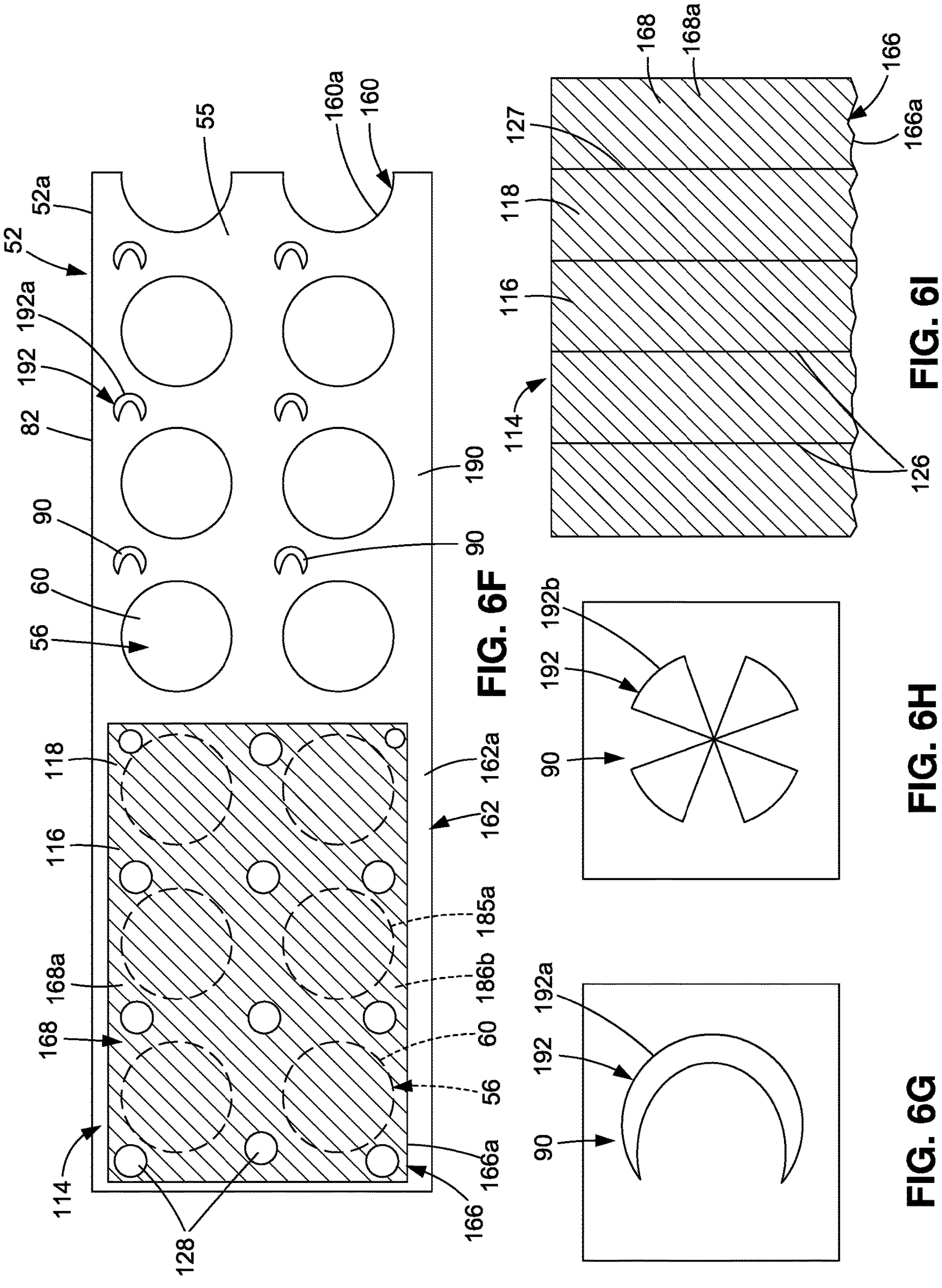
FIG. 6F is an illustration of a top view of the thermoplastic film sealing layer and the flat sheet of the reinforced thermoplastic composite laminate layer of FIG. 6E, where an uncovered portion of the reinforced thermoplastic composite laminate layer has a plurality of weld tabs formed through the uncovered portion.
FIG. 6G is an illustration of an enlarged top view of an exemplary version of a weld tab having a crescent shape.
FIG. 6H is an illustration of an enlarged top view of another exemplary version of a weld tab having a pinwheel shape.
FIG. 6I is an illustration of a top view of another exemplary version of a thermoplastic film sealing layer having reinforced woven fabric.

FIG. 6F is an illustration of a top view of the thermoplastic film sealing layer 114 in the form of the film flat sheet 116 of the thermoplastic film material 118 with the weld clearance holes 128, of FIG. 6E, coupled over the portion 185*a* of the openings 56, such as the holes 60, and the portion 186*b* of the flat sheet 82 of the reinforced thermoplastic composite laminate (RTL) layer 52 of the reinforced thermoplastic composite laminate (RTL) material 55, of FIG. 6E. FIG. 6F shows the openings 56 in the form of holes 60, and shows the first side 166, such as the interior side 166*a*, and the second side 168, such as the exterior side 168*a*, of the thermoplastic film sealing layer 114 in the form of the film flat sheet 116 with the weld clearance holes 128.

FIG. 6F shows an uncovered portion 190 of the flat sheet 82 of the reinforced thermoplastic composite laminate (RTL) layer 52, such as the reinforced thermoplastic composite laminate (RTL) inner layer 52*a*, having a plurality of weld tabs 90 formed through the uncovered portion 190. The weld tabs 90 may be cut into either the first side 160 (see FIG. 6F), such as the interior side 160*a* (see FIG. 6F), or the second side 162 (see FIG. 6F), such as the exterior side 162*a* (see FIG. 6F), of the flat sheet 82 of the reinforced thermoplastic composite laminate layer 52, such as the reinforced thermoplastic composite laminate (RTL) inner layer 52*a*, to enable thermal welding 96 (see FIG. 2), and to avoid the thickness of the thermoplastic film sealing layer 114 potentially causing delamination 156 (see FIG. 2) issues between the overlapping layers 100 (see FIG. 2) of the reinforced thermoplastic composite laminate layers 52.

FIG. 6F further shows the first side 166, such as the interior side 166*a*, of the thermoplastic film sealing layer 114 applied over the portion 186*b* of the second side 162, such as the exterior side 162*a*, of the reinforced thermoplastic composite laminate (RTL) layer 52, such as the reinforced thermoplastic composite laminate (RTL) inner layer 52*a*, and over the portion 185*a* of the openings 56. In this step of the forming process 140 (see FIG. 2) of forming the self-muffling acoustic duct assembly 10, the thermoplastic film sealing layer 114 with the weld clearance holes 128 may be applied to the portion 186*b* of the second side 162, such as the exterior side 162*a*, of the reinforced thermoplastic composite laminate (RTL) layer 52, such as the reinforced thermoplastic composite laminate (RTL) inner layer 52*a*, by thermal welding 96 (see FIG. 2). The weld clearance holes 128 formed in the thermoplastic film sealing layer 114 enable and facilitate the thermoplastic film sealing layer 114 to be thermally welded, via thermal welding 96, directly to the reinforced thermoplastic composite laminate (RTL) layer 52, such as the reinforced thermoplastic composite laminate (RTL) inner layer 52*a*, in case the thermoplastic film scaling layer 114 does not have sufficient thermal weld properties. The weld tabs 90 cut into the flat sheet 82 of the reinforced thermoplastic composite laminate (RTL) layer 52, such as the reinforced thermoplastic composite laminate (RTL) inner layer 52*a*, enable the thermal welding 96. As shown in FIG. 6F, each weld tab 90 has a weld tab profile shape 192 comprising a crescent shape 192*a*.

FIG. 6G is an illustration of an enlarged top view of an exemplary version of the weld tab 90 of FIG. 6F having a weld tab profile shape 192 comprising a crescent shape 192*a*.

FIG. 6H is an illustration of an enlarged top view of another exemplary version of a weld tab 90 having a weld tab profile shape 192 comprising a pinwheel shape 192*b*.

FIG. 6I is an illustration of a top view of another exemplary version of a thermoplastic film sealing layer 114 having reinforced woven fabric 126 included within the thermoplastic film scaling layer 114 to provide added strength and resistance to tearing. As shown in FIG. 6I, in one version, the reinforced woven fabric 126 is in the form of spaced lines 127 spaced evenly apart. In other versions, the reinforced woven fabric 126 may be added in other configurations or spacing. As further shown in FIG. 6I, the thermoplastic film sealing layer 114 is in the form of the film flat sheet 116 of the thermoplastic film material 118, and the thermoplastic film sealing layer 114 may be used in a version of the self-muffling acoustic duct assembly 10 (see FIGS. 2-4) of the disclosure. As shown in FIG. 6I, the thermoplastic film sealing layer 114 in the form of the film flat sheet 116, has the first side 166, such as the interior side 166*a*, and the second side 168, such as the exterior side 168*a*.

Now referring to FIGS. 7A-7E, FIGS. 7A-7E show various versions of welding features that may be added to the thermoplastic film sealing layer 114 and/or added to one or more of the reinforced thermoplastic composite laminate layers 52.

Figure 7A:
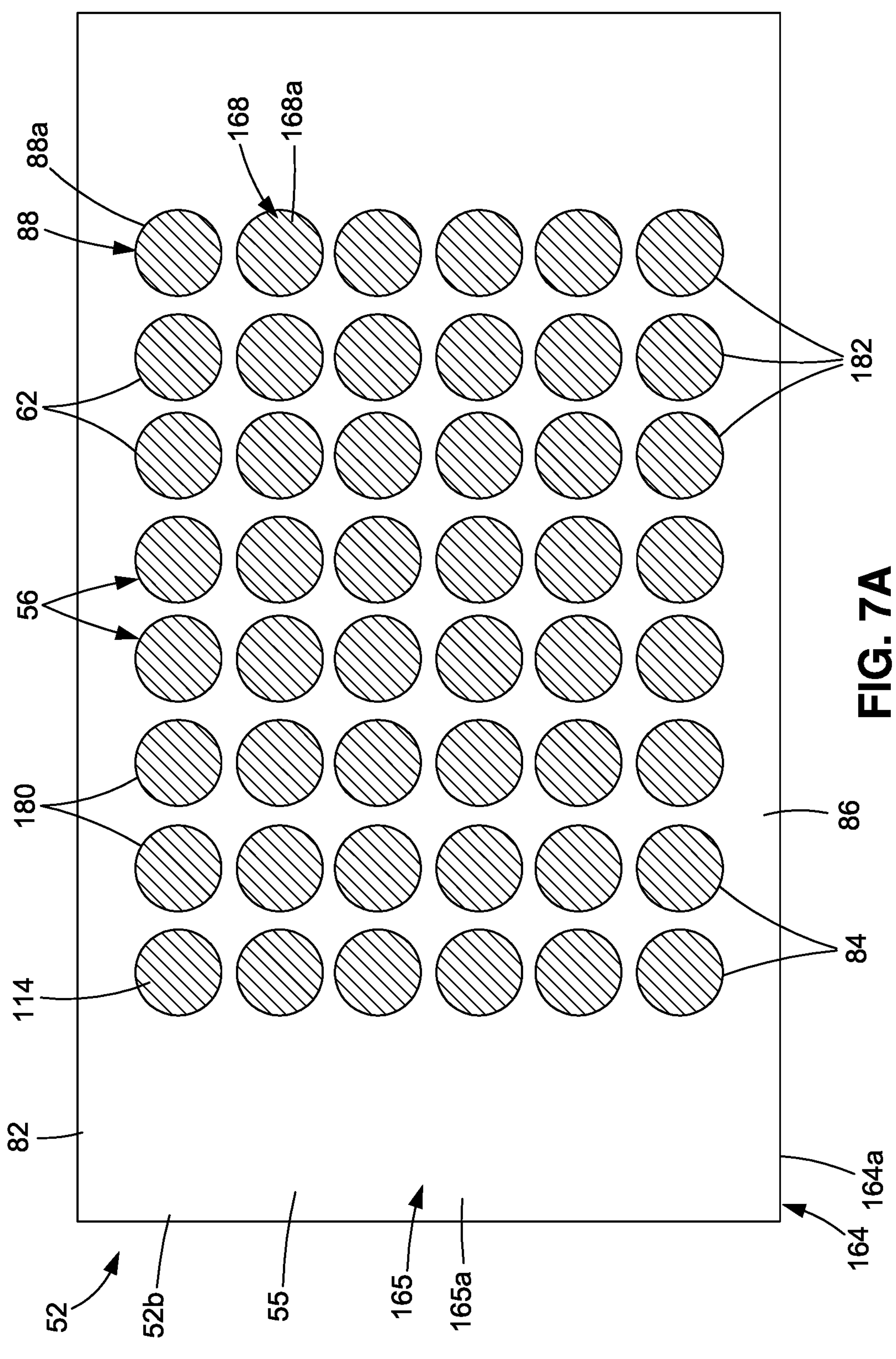
FIG. 7A is an illustration of a top view of a reinforced thermoplastic composite laminate outer layer coupled over the thermoplastic film sealing layer of FIG. 6C.

FIG. 7A is an illustration of a top view of a reinforced thermoplastic composite laminate (RTL) layer 52, such as a reinforced thermoplastic composite laminate (RTL) outer layer 52*b*, coupled over the second side 168, such as the exterior side 168*a*, of the thermoplastic film sealing layer 114, of FIG. 6C. FIG. 7A shows the first side 164, such as the interior side 164*a*, of the reinforced thermoplastic composite laminate outer layer 52*b*, and FIG. 7A further shows the second side 165, such as the exterior side 165*a*, of the reinforced thermoplastic composite laminate outer layer 52*b*.

FIG. 7A shows the flat sheet 82 of the reinforced thermoplastic composite laminate (RTL) layer 52, such as the reinforced thermoplastic composite laminate outer layer 52*b*, made of the reinforced thermoplastic composite laminate (RTL) material 55, and having the plurality of openings 56 that may be used in a version of the self-muffling acoustic duct assembly 10 (see FIGS. 2-4) of the disclosure. FIG. 7A shows the open area 84, or controlled porosity, of the plurality of openings 56, based on the total area 86 of the reinforced thermoplastic composite laminate outer layer 52*b*. FIG. 7A further shows the flat pattern 180 of the plurality of openings 56 formed through the reinforced thermoplastic composite laminate outer layer 52*b*. The openings 56, such as in the form of perforations 62, shown in FIG. 7A, each have the shape 88 comprising the circle shape 88*a*. As shown in FIG. 7A, in this version, the shape 88 of all of the openings 56 is the same or identical, and the openings 56 are all of a uniform size 182. In other versions, the shape 88 and size of the openings 56 may be varied, with some openings 56 being the same shape and size, or with some, or all, of the openings 56 being different shapes and sizes.

In this step of the forming process 140 (see FIG. 2) of forming the self-muffling acoustic duct assembly 10, the reinforced thermoplastic composite laminate outer layer 52*b* with the openings 56 may be applied over the thermoplastic film sealing layer 114 by laminating 146 (see FIG. 2) or lamination, thermal welding 96 (see FIG. 2), adhesive bonding 148 (see FIG. 2), mechanical fastening 151 (see FIG. 2) with one or more fasteners, or another suitable coupling or attachment operation.

Figures 7B, 7C, 7D, 7E:
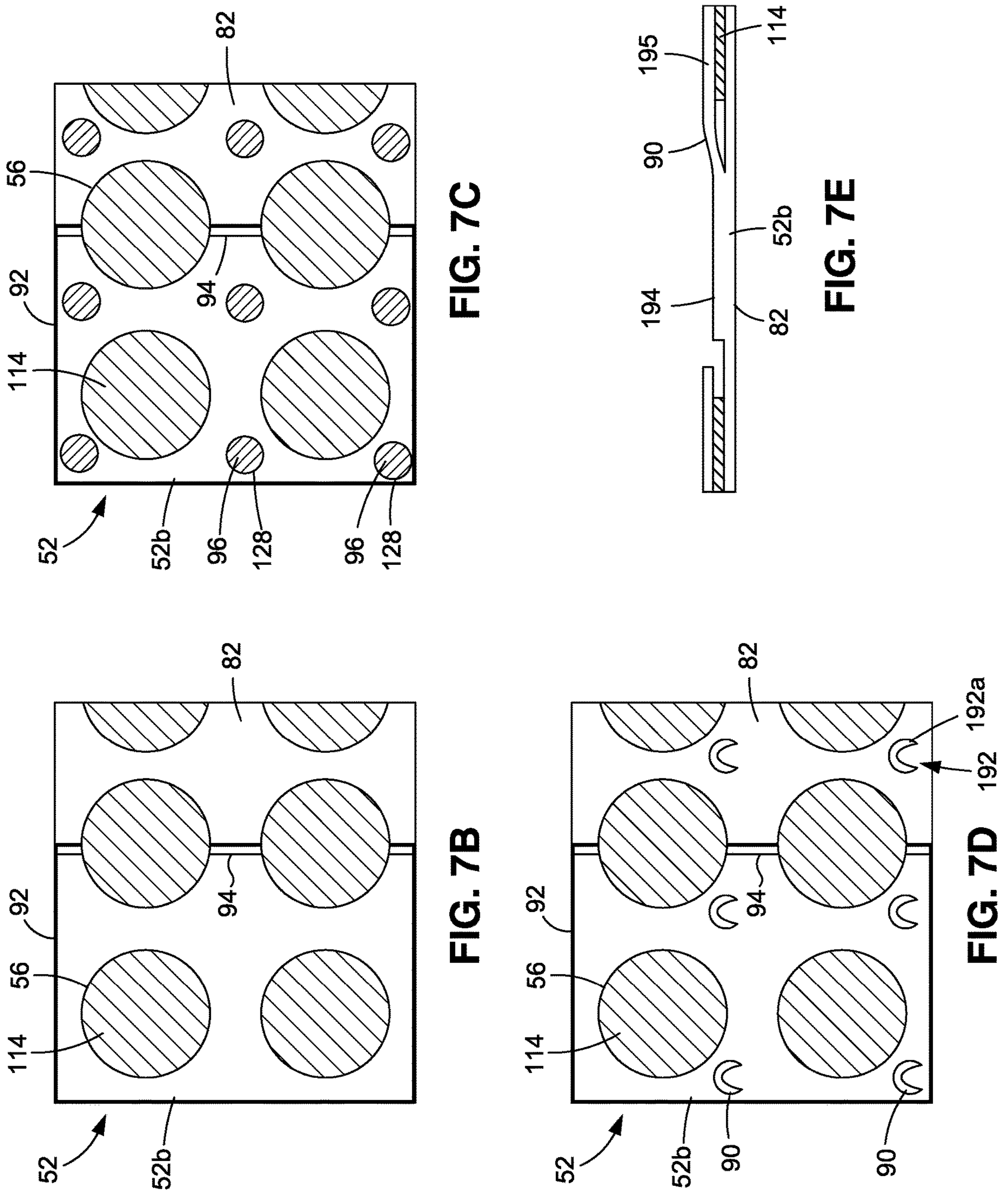
FIG. 7B is an illustration of an enlarged top view of a reinforced thermoplastic composite laminate outer layer with an extension portion welded at a thermal weld line.
FIG. 7C is an illustration of an enlarged top view of the reinforced thermoplastic composite laminate outer layer with the extension portion of FIG. 7B, and showing thermal welding through weld clearance holes.
FIG. 7D is an illustration of an enlarged top view of the reinforced thermoplastic composite laminate outer layer with the extension portion of FIG. 7B, and showing weld tabs formed through the reinforced thermoplastic composite laminate outer layer.
FIG. 7E is an illustration of an enlarged side view of a weld tab of FIG. 7D deflected over a thermoplastic film sealing layer.

FIG. 7B is an illustration of an enlarged top view of the reinforced thermoplastic composite laminate layer 52, such as the reinforced thermoplastic composite laminate outer layer 52*b*, applied over the thermoplastic film sealing layer 114, and having an extension portion 92 welded to the rest of the flat sheet 82 at a thermal weld line 94 of the reinforced thermoplastic composite laminate outer layer 52*b*, to provide added strength when thermal welding 96 (see FIG. 2) the reinforced thermoplastic composite laminate outer layer 52*b*. FIG. 7B further shows the openings 56 formed in the reinforced thermoplastic composite laminate outer layer 52*b*.

FIG. 7C is an illustration of an enlarged top view of the reinforced thermoplastic composite laminate layer 52, such as the reinforced thermoplastic composite laminate outer layer 52*b*, with the extension portion 92 welded to the rest of the flat sheet 82 at the thermal weld line 94, of FIG. 7B, and showing thermal welding 96 through weld clearance holes 128 formed in the thermoplastic film sealing layer 114. FIG. 7C further shows the openings 56 formed in the reinforced thermoplastic composite laminate outer layer 52*b* applied over the thermoplastic film scaling layer 114.

FIG. 7D is an illustration of an enlarged top view of the reinforced thermoplastic composite laminate layer 52, such as the reinforced thermoplastic composite laminate outer layer 52*b*, with the extension portion 92 welded to the rest of the flat sheet 82 at the thermal weld line 94, of FIG. 7B, and showing weld tabs 90 formed through the reinforced thermoplastic composite laminate outer layer 52*b*. Thermal welding 96 (see FIGS. 2, 7C) may be performed through the weld clearance holes 128 (see FIG. 7C) with the weld tabs 90 (see FIG. 7D). As shown in FIG. 7D, the weld tabs 90 are cut or formed into the flat sheet 82 of the reinforced thermoplastic composite laminate (RTL) outer layer 52*b*, to enable the thermal welding 96. As shown in FIG. 7D, each weld tab 90 has a weld tab profile shape 192 comprising a crescent shape 192*a*.

FIG. 7E is an illustration of an enlarged side view of a weld tab 90 of FIG. 7D deflected over a thermoplastic film sealing layer 114. Thermal welding 96 (see FIGS. 2, 7C) may be facilitated with the weld tabs 90. As shown in FIG. 7E, the weld tab 90 is deflected over the thermoplastic film sealing layer 114 or thick vapor barrier 115*a* (see FIG. 2). As further shown in FIG. 7E, the weld tab 90 comprises a base portion 194 integral with the flat sheet 82 of the reinforced thermoplastic composite laminate outer layer 52*b*, and a tab portion 195 extending from the base portion 194 and deflected over the thermoplastic film sealing layer 114.

Figures 8A, 8B:
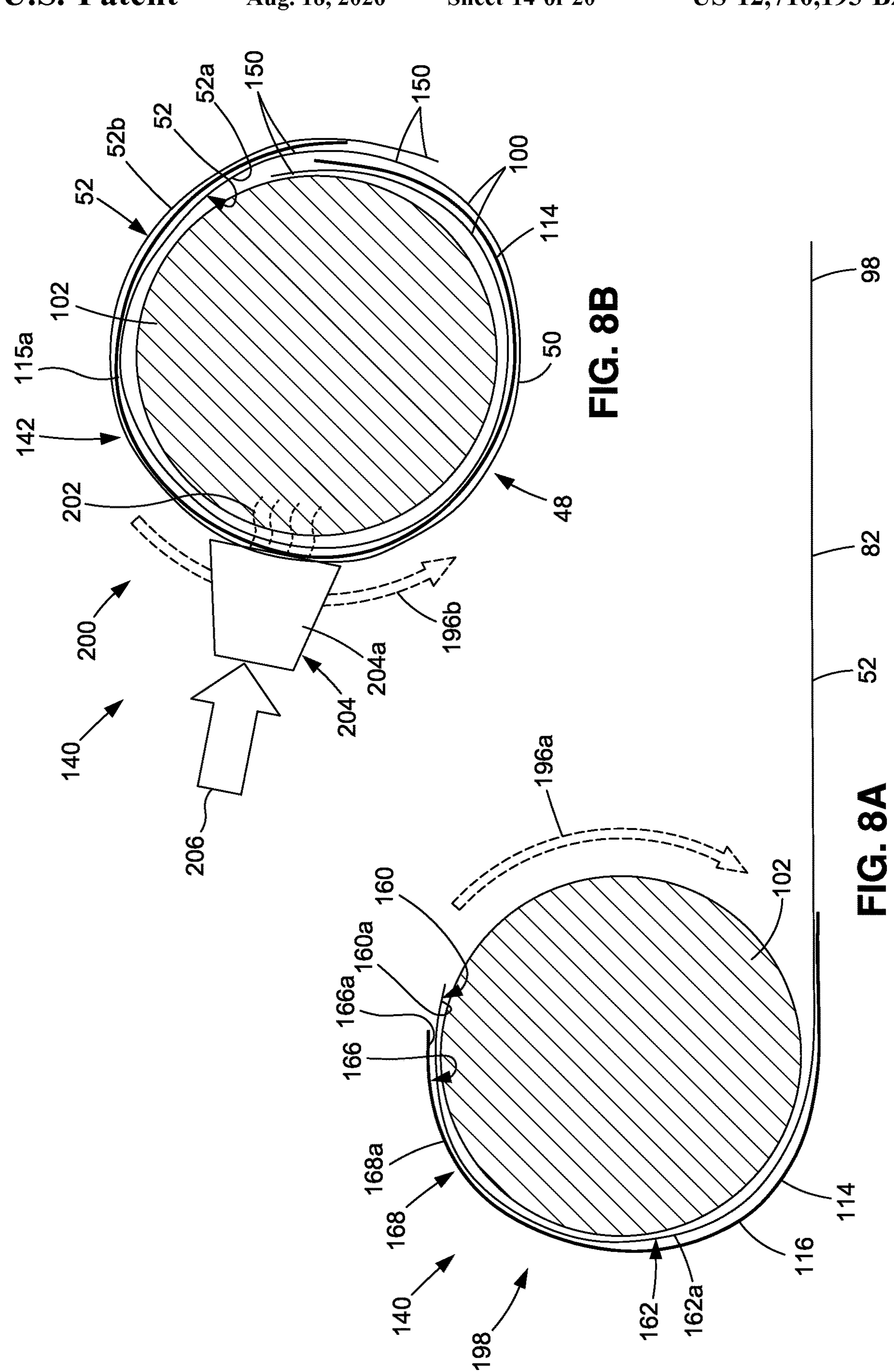
FIG. 8A is an illustration of a side view of a film flat sheet of a thermoplastic film sealing layer and a flat sheet of a reinforced thermoplastic composite laminate layer having a continuous configuration partially wrapped around a cylindrical mandrel in a wrapping step of a forming process.
FIG. 8B is an illustration of a side view of a duct formed around a cylindrical mandrel and undergoing a roll and bond seam step of a forming process.
Figure 8C:
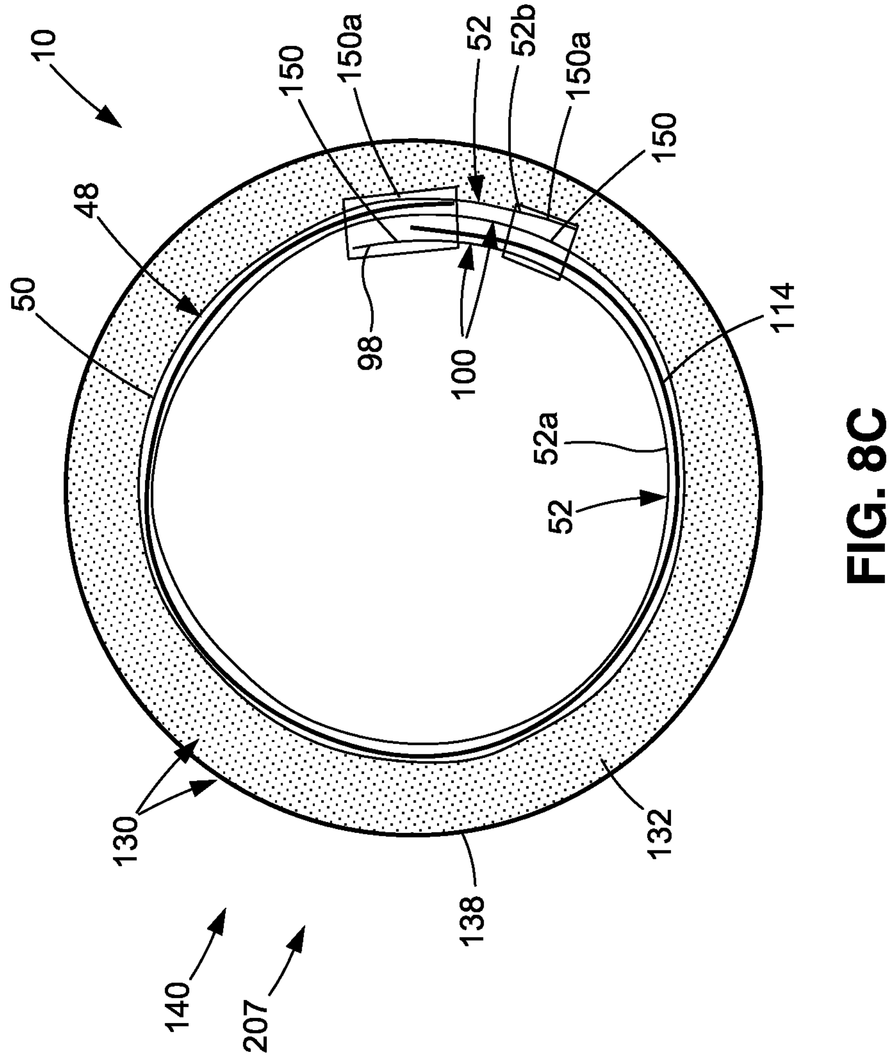
FIG. 8C is an illustration of a cross-sectional view of the duct of FIG. 8B with bonded seams and covered with an acoustic treatment in an acoustic treatment addition step of a forming process.

Now referring to FIGS. 8A-8C, FIGS. 8A-8C show steps of a version of a forming process 140 for forming an exemplary self-muffling acoustic duct assembly 10 (see FIG. 8C) formed from a film flat sheet 116 of a thermoplastic film sealing layer 114 and a flat sheet 82 of a reinforced thermoplastic composite laminate layer 52 having a continuous configuration 98.

FIG. 8A is an illustration of a side view of the film flat sheet 116 of the thermoplastic film sealing layer 114 and the flat sheet 82 of the reinforced thermoplastic composite laminate layer 52 having the continuous configuration 98 and both partially wrapped and rolled around a cylindrical mandrel 102 in a rotation direction 196*a* in a wrapping step 198 of the forming process 140. Prior to the wrapping step 198, the flat sheet 82 of the reinforced thermoplastic composite laminate layer 52 undergoes the forming operation 64 (see FIG. 5E) to form the openings 56 (see FIG. 5E) in, and through, the flat sheet 82 (see FIG. 5E) of the reinforced thermoplastic composite laminate layer 52 (see FIG. 5E).

As shown in FIG. 8A, the thermoplastic film sealing layer 114 has the first side 166, such as the interior side 166*a*, and has the second side 168, such as the exterior side 168*a*. As further shown in FIG. 8A, the reinforced thermoplastic composite laminate layer 52 forming the reinforced thermoplastic composite laminate inner layer 52*a* has the first side 160, such as the interior side 160*a*, and has the second side 162, such as the exterior side 162*a*.

In the wrapping step 198 of the forming process 140, the reinforced thermoplastic composite laminate layer 52 and the thermoplastic film sealing layer 114 are wrapped and rolled around the cylindrical mandrel 102, and since the length of the reinforced thermoplastic composite laminate layer 52 is longer than the length of the thermoplastic film sealing layer 114, the reinforced thermoplastic composite laminate layer 52 wraps around the thermoplastic film scaling layer 114, so that the thermoplastic film sealing layer

114 is embedded or sandwiched between overlapping layers 100 (see FIG. 8B) of the reinforced thermoplastic composite laminate layers 52 (see FIG. 8B), including the reinforced thermoplastic composite laminate inner layer 52*a* (see FIG. 8B) and the reinforced thermoplastic composite laminate outer layer 52*b* (see FIG. 8B), to form the duct 48 (see FIG. 8B) with the tube shape 50 (see FIG. 8B).

FIG. 8B is an illustration of a side view of the duct 48 of the self-muffling acoustic duct assembly 10 (see FIG. 8C), where the duct 48 with the tube shape 50 is formed around the cylindrical mandrel 102 and the duct 48 undergoes a roll and bond seam step 200 of the forming process 140. As shown in FIG. 8B, the duct 48 is formed with the overlapping layers 100 of the reinforced thermoplastic composite laminate layers 52 and the thermoplastic film sealing layer 114 is embedded or sandwiched between the overlapping layers 100 of the reinforced thermoplastic composite laminate layers 52, including the reinforced thermoplastic composite laminate inner layer 52*a* and the reinforced thermoplastic composite laminate outer layer 52*b*.

Seams 150 (see FIGS. 8B-8C) of the overlapping layers 100 of the reinforced thermoplastic composite laminate layers 52 enable bonding or fusing of the overlapping layers 100 to trap the thermoplastic film sealing layer 114, such as in the form of a vapor barrier 115*a*, in place and between the overlapping layers 100.

As shown in FIG. 8B, in the roll and bond seam step 200 of the forming process 140, heat 202 is applied to the duct 48 from a heat source 204, such as a heater 204*a*, or another suitable heat source, and pressure 206, or force, is applied to the duct 48 from a pressure source (not shown), as the duct 48 on the cylindrical mandrel 102, which is rotating, undergoes rolling 142 or rotating in a rotation direction 196*b*. The seams 150 of the overlapping layers 100 are bonded or fused together with the heat 202 and the pressure 206 by thermal welding 96 (see FIG. 2), adhesive bonding 148 (see FIG. 2), or another suitable bonding or fusing operation, as the duct 48 rolls or rotates on the cylindrical mandrel 102 which is rotating.

After the one or more seams 150 are rolled and bonded, welded, or fused together, additional components or details, such as spuds, flanges, or other suitable components may optionally be bonded or attached to the duct. As used herein, "spud" means a short takeoff or extension on a duct to attach a branch duct or a flex hose.

FIG. 8C is an illustration of a cross-sectional view of the duct 48 with the tube shape 50 of FIG. 8B with bonded seams 150*a* of the seams 150, where the duct 48 is covered with the acoustic treatment 130 in an acoustic treatment addition step 207 of the forming process 140. As shown in FIG. 8C, the acoustic treatment 130 comprises the insulation and noise attenuating layer 132 and the thermoplastic film outer layer 138 coupled, or attached, to the insulation and noise attenuating layer 132. The acoustic treatment 130 may be coupled, or attached, to the duct 48 with tape, bonding, or another suitable attachment means. FIG. 8C further shows the thermoplastic film sealing layer 114 embedded or sandwiched between the overlapping layers 100 of the reinforced thermoplastic composite laminate layers 52, including the reinforced thermoplastic composite laminate inner layer 52*a* and the reinforced thermoplastic composite laminate outer layer 52*b*, having the continuous configuration 98.

Now referring to FIG. 9, FIG. 9 is an illustration of a side view of an exemplary version of a duct 48, such as a straight duct 48*a*, of the self-muffling acoustic duct assembly 10 (see FIGS. 2-4) of the disclosure, where the duct 48 has the thermoplastic film sealing layer 114 captured or embedded between two reinforced thermoplastic composite laminate layers 52 comprising a spiral wound inner tape layer 112*a* and a spiral wound outer tape layer 112*b*.

As shown in FIG. 9, the spiral wound inner tape layer 112*a* is formed by spiral wrapping 108 (see also FIG. 2) one or more strips 208*a* of the inner tape layer 106*a* of the reinforced thermoplastic composite laminate (RTL) material 55 around the cylindrical mandrel 102 (see FIG. 2), or around the cylindrical tool 104 (see FIG. 2), in the first direction 110*a*. As further shown in FIG. 9, the spiral wound outer tape layer 112*b* is formed by spiral wrapping 108 (see also FIG. 2) one or more strips 208*b* of the outer tape layer 106*b* of the reinforced thermoplastic composite laminate (RTL) material 55 around the cylindrical mandrel 102 (see FIG. 2), or around the cylindrical tool 104 (see FIG. 2), in the second direction 110*b* opposite the first direction 110*a*. The plurality of openings 56 (see FIG. 9) are provided, or formed, by spaces between the spiral wound inner tape layer 112*a* and the spiral wound outer tape layer 112*b*. Preferably, the plurality of openings 56, of each of the spiral wound inner tape layer 112*a* and the spiral wound outer tape layer 112*b* have the open area 84, or the controlled porosity, in a range of 25% to 85% of the total area 86 of each of the spiral wound inner tape layer 112*a* and the spiral wound outer tape layer 112*b*. FIG. 9 further shows the tube shape 50 and the duct structure 54 of the duct 48.

Figure 10A:
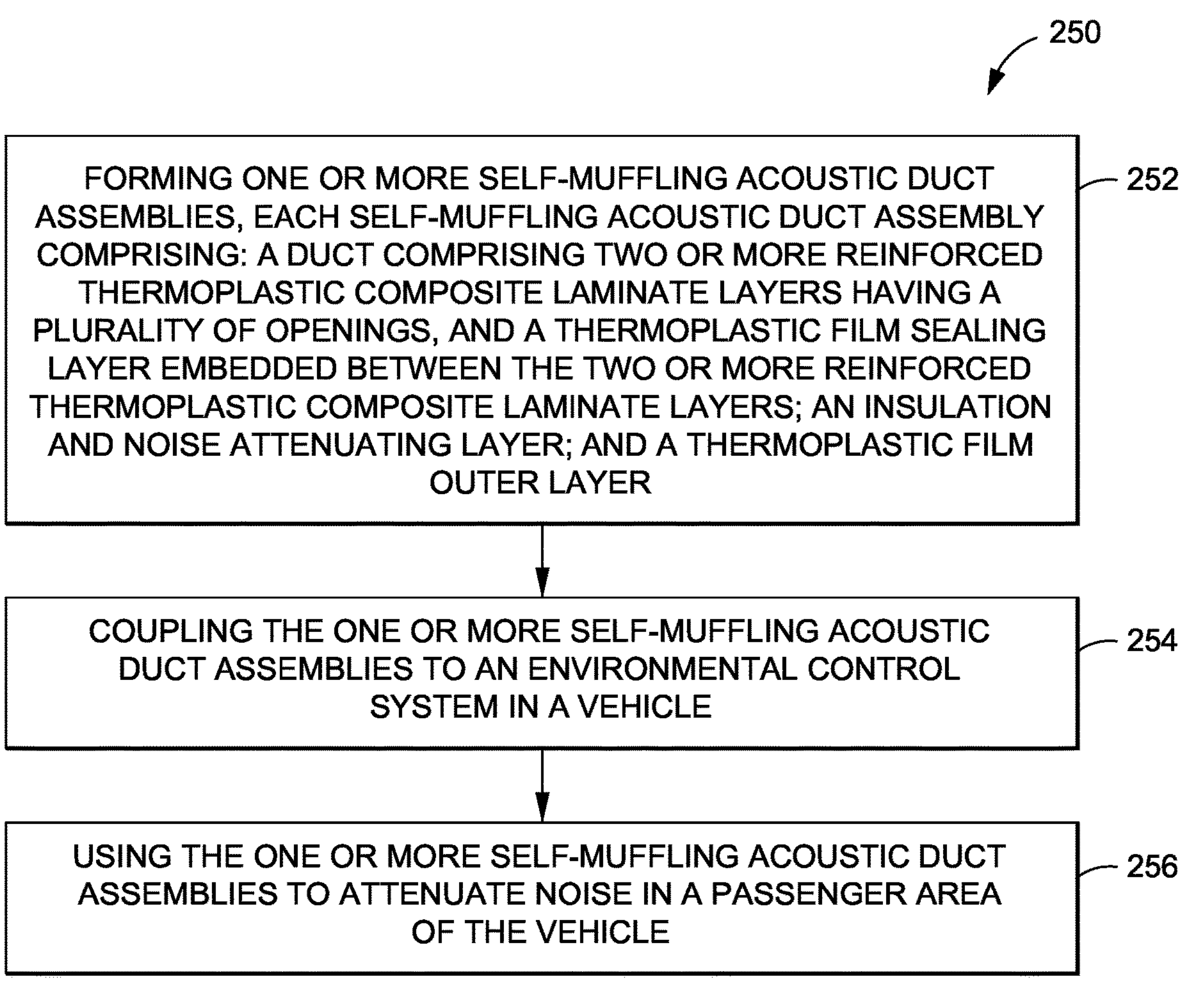
FIG. 10A is an illustration of a flow diagram of an exemplary version of a method of the disclosure.
Figure 10B:
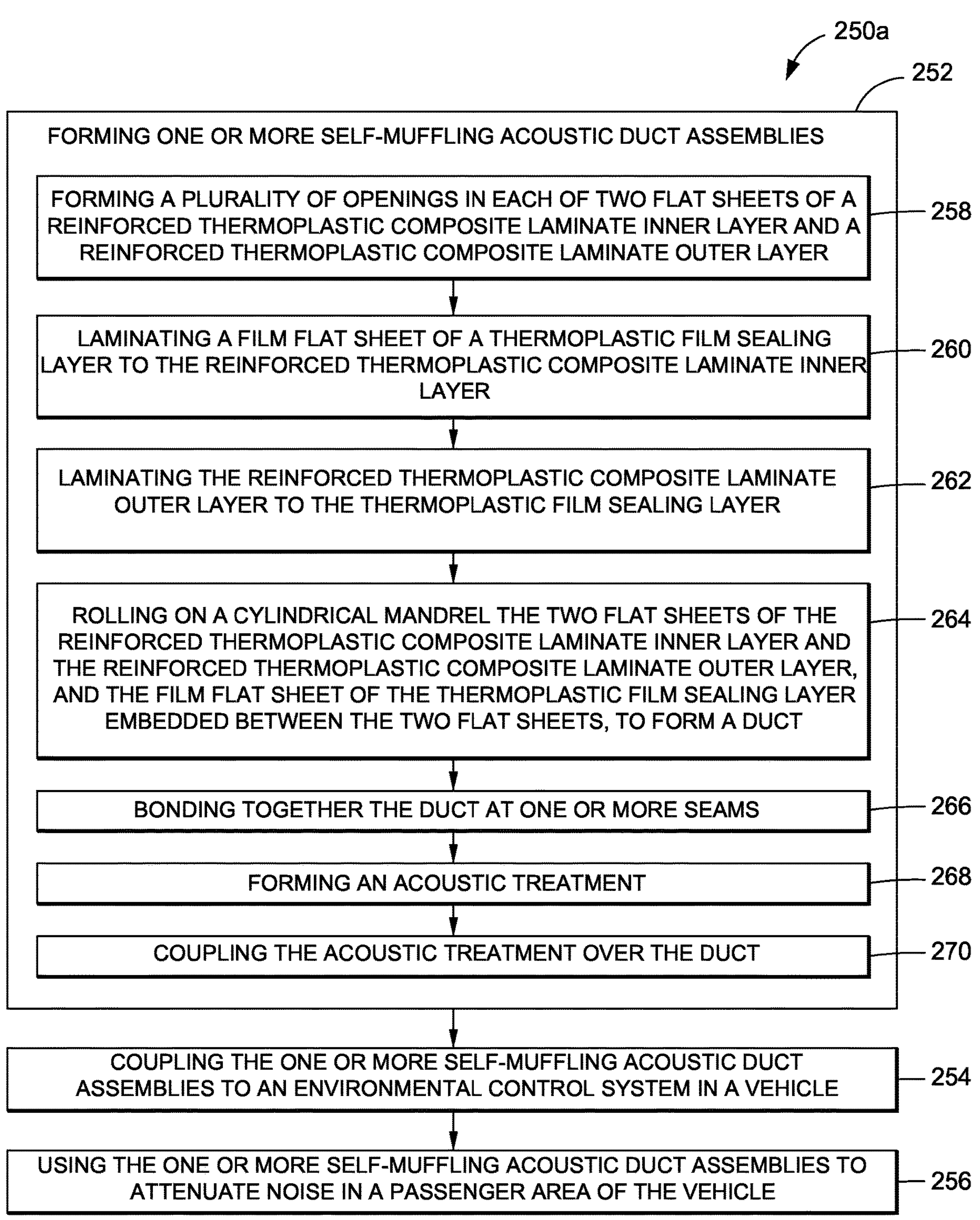
FIG. 10B is an illustration of a flow diagram of another exemplary version of a method of the disclosure.
Figure 10C:
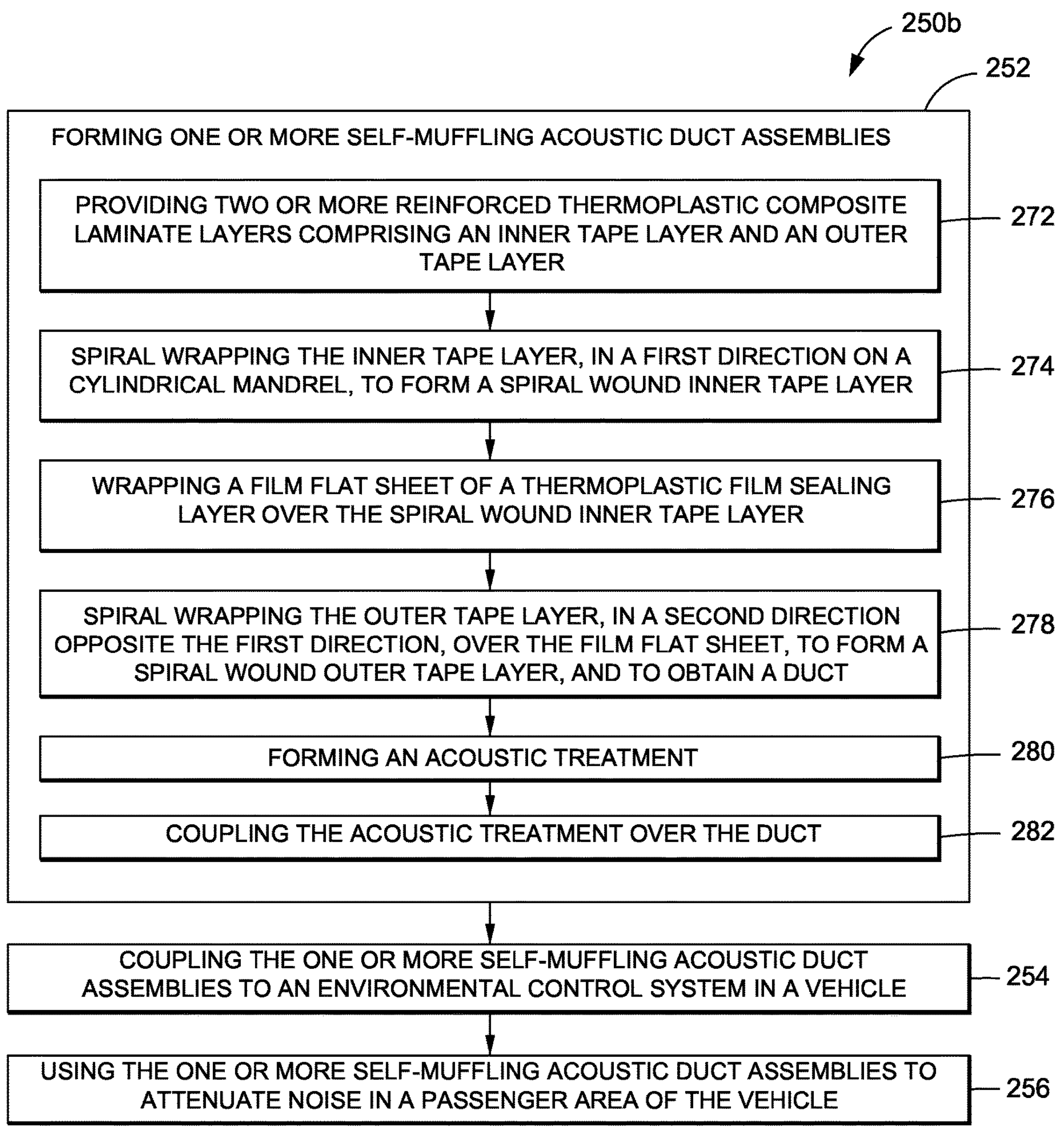
FIG. 10C is an illustration of a flow diagram of yet another exemplary version of a method of the disclosure.

Now referring to FIGS. 10A-10C, FIGS. 10A-10C show various versions of methods 250, 250*a*, 250*b* that use various versions of self-muffling acoustic duct assemblies 10 of the disclosure. FIG. 10A is an illustration of a flow diagram of an exemplary version of a method 250 of the disclosure. In another version of the disclosure, there is provided the method 250 of using one or more self-muffling acoustic duct assemblies 10, as discussed in detail above, to attenuate noise 44 (see FIG. 2), such as airflow noise 44*a* (see FIG. 2), in a vehicle 14 (see FIG. 1), such as an aircraft 14*a* (see FIG. 1), or another suitable vehicle.

FIG. 10B is an illustration of a flow diagram of another exemplary version of a method 250*a* of the disclosure. FIG. 10C is an illustration of a flow diagram of yet another exemplary version of a method 250*b* of the disclosure.

The blocks in FIGS. 10A-10C represent operations and/or portions thereof, or elements, and lines connecting the various blocks do not imply any particular order or dependency of the operations or portions thereof, or elements. FIGS. 10A-10C and the disclosure of the steps of the method 250, the method 250*a*, and the method 250*b*, set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 10A, the method 250 comprises step 252 of forming the one or more self-muffling acoustic duct assemblies 10. Each of the one or more self-muffling acoustic duct assemblies 10 comprises the duct 48 (see FIGS. 2, 3) having the tube shape 50 (see FIG. 2). The duct 48 comprises two or more reinforced thermoplastic composite laminate layers 52 (see FIGS. 2, 3) forming a duct structure 54 (see FIG. 2) of the duct 48. The two or more reinforced thermoplastic composite laminate layers 52 have a plurality of openings 56 (see FIGS. 2, 3) for the noise 44 to travel through the duct 48 and the duct walls 49 (see FIG. 2) of the duct 48. The plurality of openings 56, such as the cut-outs 58 (see FIG. 2), the holes 60 (see FIG. 2), or the perforations 62 (see FIG. 2), may be formed via a forming operation 64

(see FIG. 2) comprising one of, cutting 66 (see FIG. 2), punching 68 (see FIG. 2), machining 70 (see FIG. 2), perforating 72 (see FIG. 2), routing 74 (see FIG. 2), or another suitable forming operation for forming the plurality of openings 56. Preferably, the plurality of openings 56 have an open area 84 (see FIGS. 2, 5A) in a range of 25% to 85% of a total area 86 (see FIG. 2) of each reinforced thermoplastic composite laminate layer 52.

The duct 48 further comprises a thermoplastic film sealing layer 114 (see FIGS. 2, 3), as discussed in detail above, embedded between the two or more reinforced thermoplastic composite laminate layers 52. The thermoplastic film sealing layer 114 forms a barrier 115 (see FIG. 2), such as a vapor barrier 115*a* (see FIG. 2), to prevent leakage of air 22 (see FIG. 2) or other gaseous vapors from the duct 48, and the thermoplastic film sealing layer 114 is transparent to the noise 44 traveling through the duct 48.

Each of the self-muffling acoustic duct assemblies 10 further comprises an insulation and noise attenuating layer 132 (see FIGS. 2, 3) coupled to, and covering, an exterior surface of the duct structure 54. Each of the self-muffling acoustic duct assemblies 10 further comprises a thermoplastic film outer layer 138 (see FIGS. 2, 3) coupled to an exterior side 172*a* (see FIG. 3) of the insulation and noise attenuating layer 132.

As shown in FIG. 10A, the method 250 further comprises step 254 of coupling the one or more of the self-muffling acoustic duct assemblies 10 to an environmental control system 16 (see FIGS. 1, 2) in the vehicle 14 (see FIGS. 1, 2).

As shown in FIG. 10A, the method 250 further comprises the step 256 of using the one or more self-muffling acoustic duct assemblies 10 to attenuate noise 44 in a passenger area 24 (see FIG. 2) of the vehicle 14, by allowing transmission 46 (see FIG. 2) of the noise 44 through the duct 48 and into the insulation and noise attenuating layer 132, while avoiding delamination 156 (see FIG. 2) of the thermoplastic film sealing layer 114 in the duct 48, and while avoiding use of one or more separate zone mufflers 152 (see FIG. 2) in the duct 48.

The step 256 of using the one or more self-muffling acoustic duct assemblies 10 to attenuate noise 44 in the passenger area 24 of the vehicle 14 may further comprise, using the one or more self-muffling acoustic duct assemblies 10 to attenuate the noise 44 comprising airflow noise 44*a* (see FIG. 2) of the environmental control system 16, in the passenger area 24 comprising a cabin 26 (see FIG. 2), of the vehicle 14 comprising an aircraft 14*a* (see FIGS. 1, 2).

As shown in FIG. 10B, there is provided the method 250*a* of using one or more self-muffling acoustic duct assemblies 10 to attenuate noise 44 in the vehicle 14, where the method 250*a* comprises the step 252 of forming the one or more self-muffling acoustic duct assemblies 10. Each of the one or more self-muffling acoustic duct assemblies 10 comprises the duct 48 having the tube shape 50. The duct 48 comprises two or more reinforced thermoplastic composite laminate layers 52 forming a duct structure 54 of the duct 48. The two or more reinforced thermoplastic composite laminate layers 52 have a plurality of openings 56 (see FIGS. 2, 3) for the noise 44 to travel through the duct 48. The duct 48 further comprises a thermoplastic film sealing layer 114, as discussed in detail above, embedded between the two or more reinforced thermoplastic composite laminate layers 52. The thermoplastic film sealing layer 114 forms a barrier 115, such as a vapor barrier 115*a*, to prevent leakage of air 22 or other gaseous vapors from the duct 48, and the thermoplastic film sealing layer 114 is transparent to the noise 44 traveling through the duct 48.

As shown in FIG. 10B, the step 252 of forming the one or more self-muffling acoustic duct assembly 10 further comprises a sub-step 258 of forming the plurality of openings 56 in each of two flat sheets 82 (see FIG. 2) of the reinforced thermoplastic composite laminate layers 52, where the reinforced thermoplastic composite laminate layers 52 comprise a reinforced thermoplastic composite laminate inner layer 52*a* (see FIG. 3) and a reinforced thermoplastic composite laminate outer layer 52*b* (see FIG. 3). Preferably, the plurality of openings 56 in each of the two flat sheets 82 are matched in size and aligned with each other.

The sub-step 258 of forming the plurality of openings 56 in each of the two flat sheets 82 of the reinforced thermoplastic composite laminate layers 52 may further comprise, forming the plurality of openings 56 via a forming operation 64 (see FIG. 2) comprising one of, cutting 66 (see FIG. 2), punching 68 (see FIG. 2), machining 70 (see FIG. 2), perforating 72 (see FIG. 2), or routing 74 (see FIG. 2) the plurality of openings 56, so that the plurality of openings 56 of each of the two flat sheets 82 has an open area 84 (see FIG. 2), or controlled porosity, in a range of 25% to 85% of the total area 86 (see FIG. 2) of each of the two flat sheets 82.

As shown in FIG. 5E, in one version, the plurality of openings 56, such as cut-outs 58 (see FIG. 2), holes 60 (see FIG. 2), or perforations 62 (see FIG. 2), may be formed by cutting 66 with a cutting apparatus 76 (see FIG. 5E), such as an ultrasonic knife 78 (see FIG. 5E). Alternatively, the plurality of openings 56, cut-outs 58, holes 60, or perforations 62, may be formed by cutting 66 with a ply cutter, a water jet cutter, or another suitable cutting apparatus. In other versions, the plurality of openings 56, cut-outs 58, holes 60, or perforations 62, may be formed by punching 68 the openings 56, cut-outs 58, holes 60, or perforations 62, such as manually punching the openings 56, cut-outs 58, holes 60, or perforations 62, or the plurality of openings 56 may be formed by machining 70 the openings 56, cut-outs 58, holes 60, or perforations 62, with a cutting machine, or the plurality of openings 56, cut-outs 58, holes 60, or perforations 62, may be formed by perforating 72, routing 74, or another suitable forming process.

As shown in FIG. 10B, the step 252 of forming the one or more self-muffling acoustic duct assembly 10 further comprises a sub-step 260 of laminating a first side of a film flat sheet 116 of the thermoplastic film sealing layer 114 to an exterior surface of the reinforced thermoplastic composite laminate inner layer 52*a*. In particular, the first side 166 (see FIG. 3), such as the interior side 166*a* (see FIG. 3), of the thermoplastic film sealing layer 114, in the form of the film flat sheet 116, is laminated to the second side 162 (see FIG. 3), such as the exterior side 162*a* (see FIG. 3), of the reinforced thermoplastic composite laminate inner layer 52*a*.

As shown in FIG. 10B, the step 252 of forming the one or more self-muffling acoustic duct assembly 10 further comprises a sub-step 262 of laminating an interior surface, or interior side 164*a* (see FIG. 3), of the reinforced thermoplastic composite laminate outer layer 52*b* (see FIG. 3) to a second side of the film flat sheet 116 of the thermoplastic film sealing layer 114, and in particular, to a second side 168 (see FIG. 3), such as an exterior side 168*a* (see FIG. 3), of the thermoplastic film sealing layer 114 comprising the film flat sheet 116, so that the thermoplastic film sealing layer 114 is embedded between the reinforced thermoplastic composite laminate inner layer 52*a* and the reinforced thermoplastic composite laminate outer layer 52*b*.

The sub-step 260 of laminating the first side of the film flat sheet 116 of the thermoplastic film sealing layer 114 to the exterior surface of the reinforced thermoplastic composite laminate inner layer 52*a*, and the sub-step 262 of laminating the interior surface of the reinforced thermoplastic composite laminate outer layer 52*b* to the second side of the film flat sheet 116 of the thermoplastic film sealing layer 114, may further comprise, laminating 146 (see FIG. 2) via one of, thermal welding 96 (see FIG. 2); thermal welding 96 with a plurality of weld clearance holes 128 (see FIG. 2) formed through the thermoplastic film sealing layer 114; thermal welding 96 with an extension portion 92 (see FIGS. 2, 7B) at a thermal weld line 94 (see FIGS. 2, 7B), on the reinforced thermoplastic composite laminate inner layer 52*a*, or on the reinforced thermoplastic composite laminate outer layer 52*b*; thermal welding 96 with the flat sheet 82 of at least one of the two or more reinforced thermoplastic composite laminate layers 52 having one or more weld tabs 90 (see FIGS. 2, 6F) cut into the flat sheet 82; or adhesive bonding 148 (see FIG. 2).

As shown in FIG. 10B, the step 252 of forming the one or more self-muffling acoustic duct assembly 10 further comprises a sub-step 264 of rolling on a cylindrical mandrel 102 (see FIGS. 2, 8A), or a cylindrical tool 104 (see FIG. 2), the two flat sheets 82 of the reinforced thermoplastic composite laminate layers 52 and the film flat sheet 116 of the thermoplastic film sealing layer 114, such as the thermoplastic film sealing layer 114 comprising the film flat sheet 116, laminated and embedded between the two flat sheets 82, to form the duct 48 (see FIG. 8B) having the tube shape 50.

As shown in FIG. 10B, the step 252 of forming the one or more self-muffling acoustic duct assembly 10 further comprises a sub-step 266 of bonding together the duct 48 at one or more seams 150 (see FIG. 2), and in particular, bonding the seams 150 of the two flat sheets 82 of the reinforced thermoplastic composite laminate layers 52 and the film flat sheet 116 of the thermoplastic film sealing layer 114, such as the thermoplastic film sealing layer 114 comprising the film flat sheet 116, laminated and embedded between the two flat sheets 82.

As shown in FIG. 10B, the step 252 of forming the one or more self-muffling acoustic duct assembly 10 further comprises a sub-step of forming 268 an acoustic treatment 130 (see FIGS. 2, 3). The acoustic treatment 130 comprises the insulation and noise attenuating layer 132 with the thermoplastic film outer layer 138 laminated to the exterior surface of the insulation and noise attenuating layer 132. The thermoplastic film outer layer 138 is coupled, or laminated, to the exterior side 172*a* (see FIG. 3), or exterior surface, of the insulation and noise attenuating layer 132.

As shown in FIG. 10B, the step 252 of forming the one or more self-muffling acoustic duct assembly 10 further comprises a sub-step of coupling 270 the acoustic treatment 130 over the exterior surface of the duct structure 54. The insulation and noise attenuating layer 132 is coupled to, and covers, an exterior surface of the duct structure 54, such as the exterior side 165*a* (see FIG. 3) of the reinforced thermoplastic composite laminate outer layer 52*b*.

As shown in FIG. 10B, the method 250*a* further comprises the step 254 of coupling the one or more of the self-muffling acoustic duct assemblies 10 to an environmental control system 16 (see FIGS. 1, 2) in the vehicle 14 (see FIGS. 1, 2).

As shown in FIG. 10B, the method 250*a* further comprises the step 256 of using the one or more self-muffling acoustic duct assemblies 10 to attenuate noise 44 in a passenger area 24 (see FIG. 2) of the vehicle 14, by allowing transmission 46 (see FIG. 2) of the noise 44 through the duct 48 and into the insulation and noise attenuating layer 132, while avoiding delamination 156 (see FIG. 2) of the thermoplastic film sealing layer 114 in the duct 48, and while avoiding use of one or more separate zone mufflers 152 (see FIG. 2) in the duct 48.

The step 256 of using the one or more self-muffling acoustic duct assemblies 10 to attenuate noise 44 in the passenger area 24 of the vehicle 14 may further comprise, using the one or more self-muffling acoustic duct assemblies 10 to attenuate the noise 44 comprising airflow noise 44*a* (see FIG. 2) of the environmental control system 16, in the passenger area 24 comprising a cabin 26, of the vehicle 14 comprising an aircraft 14*a* (see FIG. 1).

As shown in FIG. 10C, there is provided the method 250*b* of using one or more self-muffling acoustic duct assemblies 10 to attenuate noise 44 in the vehicle 14, where the method 250*b* comprises the step 252 of forming the one or more self-muffling acoustic duct assemblies 10. Each of the one or more self-muffling acoustic duct assemblies 10 comprises the duct 48 having the tube shape 50. The duct 48 comprises two or more reinforced thermoplastic composite laminate layers 52 forming a duct structure 54 of the duct 48. The two or more reinforced thermoplastic composite laminate layers 52 have a plurality of openings 56 for the noise 44 to travel through the duct 48. The duct 48 further comprises a thermoplastic film sealing layer 114, as discussed in detail above, embedded between the two or more reinforced thermoplastic composite laminate layers 52. The thermoplastic film sealing layer 114 forms a barrier 115 (see FIG. 2), such as a vapor barrier 115*a* (see FIG. 2), to prevent leakage of air 22 or other gaseous vapors from the duct 48, and the thermoplastic film sealing layer 114 is transparent to the noise 44 traveling through the duct 48.

As shown in FIG. 10C, the step 252 of forming the one or more self-muffling acoustic duct assembly 10 further comprises a sub-step 272 of providing two or more reinforced thermoplastic composite laminate layers 52 comprising an inner tape layer 106*a* (see FIGS. 2, 9) and an outer tape layer 106*b* (see FIGS. 2, 9).

As shown in FIG. 10C, the step 252 of forming the one or more self-muffling acoustic duct assembly 10 further comprises a sub-step 274 of spiral wrapping 108 (see FIGS. 2, 9) the inner tape layer 106*a*, in a first direction 110*a* (see FIG. 9) on a cylindrical mandrel 102 (see FIG. 2), or a cylindrical tool 104 (see FIG. 2), to form a spiral wound inner tape layer 112*a* (see FIGS. 2, 9).

As shown in FIG. 10C, the step 252 of forming the one or more self-muffling acoustic duct assembly 10 further comprises a sub-step 276 of wrapping 144 (see FIG. 2) a first side of a film flat sheet 116 of the thermoplastic film sealing layer 114, and in particular, wrapping a first side 166, such as an interior side 166*a*, of the thermoplastic film sealing layer 114 comprising the film flat sheet 116, over an exterior surface of the spiral wound inner tape layer 112*a* on the cylindrical mandrel 102.

As shown in FIG. 10C, the step 252 of forming the one or more self-muffling acoustic duct assembly 10 further comprises a sub-step 278 of spiral wrapping 108 (see FIGS. 2, 9) the outer tape layer 106*b* (see FIG. 9), in a second direction 110*b* (see FIG. 9) opposite the first direction 110*a* on the cylindrical mandrel 102, over a second side of the film flat sheet 116 of the thermoplastic film sealing layer 114, and in particular, over a second side 168, such as an exterior side 168*a*, of the thermoplastic film sealing layer 114 comprising the film flat sheet 116, to form a spiral wound outer tape layer 112*b* (see FIG. 9), and to obtain the duct 48, so that the thermoplastic film sealing layer 114 is embedded between the spiral wound inner tape layer 112*a* and the spiral wound outer tape layer 112*b*, and so that the plurality of openings 56 (see FIG. 9) are provided between the spiral wound inner tape layer 112*a* and the spiral wound outer tape layer 112*b*.

As shown in FIG. 10C, the step 252 of forming the one or more self-muffling acoustic duct assembly 10 further comprises a sub-step 280 of forming the acoustic treatment 130 (see FIG. 2). The acoustic treatment 130 comprises the insulation and noise attenuating layer 132 (see FIG. 2) with the thermoplastic film outer layer 138 (see FIG. 2) laminated to the exterior surface of the insulation and noise attenuating layer 132. The insulation and noise attenuating layer 132 is coupled to, and covers, an exterior surface of the duct structure 54. The thermoplastic film outer layer 138 is coupled or laminated to the exterior surface of the insulation and noise attenuating layer 132.

As shown in FIG. 10C, the step 252 of forming the one or more self-muffling acoustic duct assembly 10 further comprises a sub-step 282 of coupling the acoustic treatment 130 over the exterior surface of the duct structure 54.

As shown in FIG. 10C, the method 250*b* further comprises the step 254 of coupling the one or more of the self-muffling acoustic duct assemblies 10 to the environmental control system 16 in the vehicle 14.

As shown in FIG. 10C, the method 250*b* further comprises the step 256 of using the one or more self-muffling acoustic duct assemblies 10 to attenuate noise 44 in a passenger area 24 of the vehicle 14, by allowing transmission of the noise 44 through the duct 48 and into the insulation and noise attenuating layer 132, while avoiding delamination 156 (see FIG. 2) of the thermoplastic film sealing layer 114 in the duct 48, and while avoiding use of one or more separate zone mufflers 152 (see FIG. 2) in the duct 48.

The step 256 of using the one or more self-muffling acoustic duct assemblies 10 to attenuate noise 44 in the passenger area 24 of the vehicle 14 may further comprise, using the one or more self-muffling acoustic duct assemblies 10 to attenuate the noise 44 comprising airflow noise 44*a* (see FIG. 2) of the environmental control system 16, in the passenger area 24 comprising a cabin 26, of the vehicle 14 comprising an aircraft 14*a*.

Figures 11, 12:
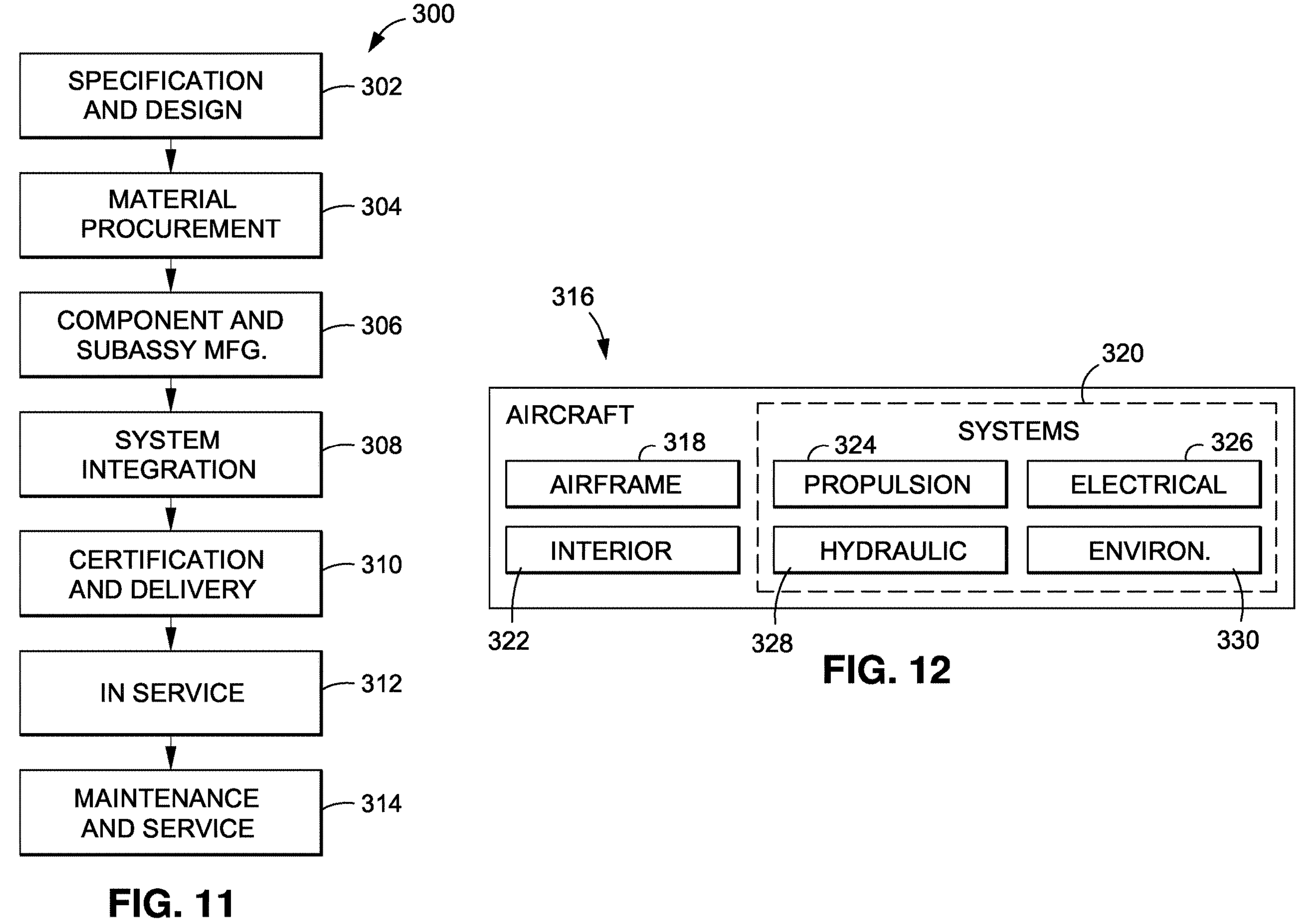
FIG. 11 is an illustration of a flow diagram of an exemplary aircraft manufacturing and service method.
FIG. 12 is an illustration of an exemplary block diagram of an aircraft.

Now referring to FIGS. 11 and 12, FIG. 11 is an illustration of a flow diagram of an exemplary aircraft manufacturing and service method 300, and FIG. 12 is an illustration of an exemplary block diagram of an aircraft 316. Referring to FIGS. 11 and 12, versions of the disclosure may be described in the context of the aircraft manufacturing and service method 300 as shown in FIG. 11, and the aircraft 316 as shown in FIG. 12.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 12, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the self-muffling acoustic duct assembly 10 (see FIG. 2), the aircraft 14*a* (see FIGS. 1, 2) with the self-muffling acoustic duct assemblies 10, and the method 250 (see FIG. 10A), the method 250*a* (see FIG. 10B), and the method 250*b* (see FIG. 10C) provide an improved acoustic duct assembly and method for an environmental control system 16 (see FIG. 1) in a vehicle 14 (see FIG. 1), having self-muffling capabilities that avoid the use of separate zone mufflers 152 (see FIG. 2) and provide separate zone muffler avoidance 154 (see FIG. 2), and provide self-muffling acoustic ducting having a reduced weight, a compact size and volume, a reduced part count, and a reduced cost to manufacture. In addition, the self-muffling acoustic duct assembly 10 provides an improved acoustic duct assembly that allows for transmission 46 (see FIG. 2) of noise 44 (see FIG. 2) through the duct wall 49 (see FIG. 2) of the duct 48, to an insulation and noise attenuating layer 132 (see FIG. 2) without a risk of delamination 156 (see FIG. 2) of the thermoplastic film sealing layer 114 (see FIG. 2) in the duct design, to provide for delamination avoidance 158 (see FIG. 2). In addition, the self-muffling acoustic duct assembly 10 prevents noise 44 from escaping into air ducts in a passenger area 24 (see FIG. 1), such as a cabin 26 (see FIG. 1) in the vehicle 14 (see FIG. 1), does not require additive manufacturing to make, is easy to assemble and produce, and provides other advantages over known duct assemblies, systems, and methods.

Moreover, disclosed versions of the self-muffling acoustic duct assembly 10 (see FIG. 2), the aircraft 14*a* (see FIGS. 1, 2) with the self-muffling acoustic duct assemblies 10, and the method 250 (see FIG. 10A), the method 250*a* (see FIG. 10B), and the method 250*b* (see FIG. 10C) provide the thermoplastic film sealing layer 114 sandwiched between reinforced thermoplastic composite laminate (RTL) layers

52 to capture and embed the thermoplastic film sealing layer 114 and prevent it from delaminating. The thermoplastic film sealing layer 114 is of a thin and lightweight construction. The thermoplastic film sealing layer 114 allows noise 44 (see FIG. 2) to exit the duct 48 (see FIG. 2) and travel through the duct walls 49 (see FIG. 2), to prevent noise 44 from escaping into the air ducts in the cabin 26 of the aircraft 14*a*. In addition, the thermoplastic film sealing layer 114 prevents air 22 (see FIG. 2) from leaking out of the duct 48, which would lessen the air 22 delivered to the air ducts for heating or cooling. The sandwich design using RTL/film/RTL allows the noise 44 to escape through the thermoplastic film sealing layer 114, without the risk of delamination 156 (see FIG. 2) of the thermoplastic film sealing layer 114, if adhered on the second side 162 (see FIG. 3) of the reinforced thermoplastic composite laminate inner layer 52*a*, or without the risk of delaminating or rupturing if laminated to the first side 164 (see FIG. 3) of the reinforced thermoplastic composite laminate outer layer 52*b*.

The self-muffling acoustic duct assembly 10 is lightweight as the majority of the reinforced thermoplastic composite laminate (RTL) material 55 (see FIG. 2) is removed to form openings 56 via a forming operation 64 (see FIG. 2), such as cutting 66 (see FIG. 2), punching 68 (see FIG. 2), machining 70 (see FIG. 2), perforating 72 (see FIG. 2), routing 74 (see FIG. 2), or another suitable forming operation. The self-muffling acoustic duct assembly 10 is also easy to produce since the plurality of openings 56, such as the cut-outs 58, holes 60, perforations 62, or other suitable openings may be formed, such as being cut, while the reinforced thermoplastic composite laminate (RTL) material 55 is flat in the form of the flat sheet 82 (see FIG. 2), before rolling 142 (see FIG. 2) and securing the one or more seams 150 (see FIG. 2). The thermoplastic film scaling layer 114 may also be laminated in while the reinforced thermoplastic composite laminate (RTL) material 55 is flat and while the thermoplastic film sealing layer 114 is flat.

Further, disclosed versions of the self-muffling acoustic duct assembly 10 (see FIG. 2), the aircraft 14*a* (see FIGS. 1, 2) with the self-muffling acoustic duct assemblies 10, and the method 250 (see FIG. 10A), the method 250*a* (see FIG. 10B), and the method 250*b* (see FIG. 10C) provide the structural part of the duct 48 using the reinforced thermoplastic composite laminate (RTL) material 55 in the flat sheet 82 form with the plurality of openings 56. The thermoplastic film sealing layer 114 functions as a pressure vessel 169 (see FIG. 3), such as an air containment pressure vessel 169*a* (see FIG. 3), to prevent leakage of air 22 (see FIGS. 1, 2) and other gaseous vapors out of the duct 48. The noise 44 (see FIG. 2), such as airflow noise 44*a* (see FIG. 2), is attenuated in the insulation and noise attenuating layer 132 comprising one of, the open cell foam 134 (see FIG. 2), the fiberglass batting 135 (see FIG. 2), the aramid felt 136 (see FIG. 2), or another suitable insulation and noise attenuating material. The noise 44 escapes through the openings 56 in the duct structure 54 comprising the reinforced thermoplastic composite laminate (RTL) layers 52, or reinforced thermoplastic composite laminate (RTL) shell, through the thermoplastic film scaling layer 114 that is transparent to the noise 44. The thermoplastic film sealing layer 114 is captured or embedded between the reinforced thermoplastic composite laminate (RTL) layers 52, and the reinforced thermoplastic composite laminate (RTL) layers 52 form the duct structure 54 (see FIG. 2), and the thermoplastic film sealing layer 114 forms the pressure vessel 169 (see FIG. 3) preventing leakage of air 22 or other gaseous vapors. The thermoplastic film sealing layer 114 can be adhered to the second side 162 (see FIG. 3) of the reinforced thermoplastic composite laminate (RTL) inner layer 52*a*, as long as it is bonded sufficiently to prevent delamination 156 (see FIG. 2) of the thermoplastic film sealing layer 114. The thermoplastic film sealing layer 114 can be bonded to the first side 164 (see FIG. 3) of the reinforced thermoplastic composite laminate (RTL) outer layer 52*b*, as long as air pressure loads do not cause delamination 156.

In another version, as shown in FIGS. 2, 9, the two or more reinforced thermoplastic composite laminate layers 52 comprise the inner tape layer 106*a* and the outer tape layer 106*b*. The inner tape layer 106*a* undergoes the spiral wrapping 108 (see FIGS. 2, 9), in the first direction 110*a* (see FIGS. 2, 9) on the cylindrical mandrel 102 (see FIG. 2), or the cylindrical tool 104 (see FIG. 2), to form the spiral wound inner tape layer 112*a* (see FIGS. 2, 9). The outer tape layer 106*b* (see FIGS. 2, 9) undergoes the spiral wrapping 108, in the second direction 110*b* (see FIGS. 2, 9) opposite the first direction 110*a*, on the cylindrical mandrel 102, or the cylindrical tool 104, to form the spiral wound outer tape layer 112*b* (see FIGS. 2, 9). The plurality of openings 56 (see FIGS. 2, 9) are provided or formed by spaces between the spiral wound inner tape layer 112*a* and the spiral wound outer tape layer 112*b*.

In addition, the self-muffling acoustic duct assembly 10 may be used in lieu of separate zone mufflers 152 (see FIG. 2) and provide separate zone muffler avoidance 154 (see FIG. 2), to reduce noise 44 (see FIG. 2), such as airflow noise 44*a* (see FIG. 2), or air conditioning noise, introduced into the occupied areas, such as the passenger area 24, for example, the cabin 26 (see FIG. 1), of the vehicle 14 (see FIG. 1), such as the aircraft 14*a* (see FIG. 1). By providing separate zone muffler avoidance 154 (see FIG. 2), the overall weight of the aircraft 14*a* is reduced, as such separate zone mufflers 152 are heavy and take up a large volume of space on an aircraft. Moreover, by providing separate zone muffler avoidance 154 (see FIG. 2), the overall cost of the manufacturing the aircraft 14*a* is reduced, as such separate zone mufflers 152 are expensive to make and labor intensive to install in the aircraft 14*a*. Further, any straight duct 48*a* (see FIG. 2) can use this self-muffling acoustic duct design and the self-muffling acoustic duct assembly 10 to allow increased muffling or attenuation of noise 44, without increased cost, without increased weight, and without taking up increased space in the aircraft volume. The self-muffling acoustic duct assembly 10 reduces noise 44 to the passenger area 24, such as the cabin 26, generated by the environmental control system 16 and the air 22 flowing through the ducts 48.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A self-muffling acoustic duct assembly for noise attenuation in a vehicle, the self-muffling acoustic duct assembly comprising:

a duct having a tube shape, the duct comprising:

two or more reinforced thermoplastic composite laminate layers forming a duct structure of the duct, the two or more reinforced thermoplastic composite laminate layers having a plurality of openings for noise to travel through the duct; and a thermoplastic film sealing layer embedded between the two or more reinforced thermoplastic composite laminate layers, the thermoplastic film sealing layer forming a barrier to prevent leakage of air from the duct and being transparent to the noise traveling through the duct;

an insulation and noise attenuating layer coupled to, and covering, the duct structure; and a thermoplastic film outer layer coupled to the insulation and noise attenuating layer, wherein the duct, the insulation and noise attenuating layer, and the thermoplastic film outer layer form the self-muffling acoustic duct assembly for noise attenuation in the vehicle, and further wherein the duct allows transmission of the noise through the duct and into the insulation and noise attenuating layer where the noise is attenuated, while avoiding delamination of the thermoplastic film sealing layer in the duct, and while avoiding use of one or more separate zone mufflers in the duct.

2. The self-muffling acoustic duct assembly of claim 1, wherein the two or more reinforced thermoplastic composite laminate layers are separate and comprise a reinforced thermoplastic composite laminate inner layer and a reinforced thermoplastic composite laminate outer layer.

3. The self-muffling acoustic duct assembly of claim 1, wherein the two or more reinforced thermoplastic composite laminate layers are continuous and rolled up to form two or more overlapping layers.

4. The self-muffling acoustic duct assembly of claim 1, wherein the two or more reinforced thermoplastic composite laminate layers each comprises a flat sheet with the plurality of openings formed through the flat sheet, the plurality of openings formed via one of, cutting, punching, machining, perforating, or routing the plurality of openings.

5. The self-muffling acoustic duct assembly of claim 4, wherein the plurality of openings of the flat sheet of each of the two or more reinforced thermoplastic composite laminate layers have an open area in a range of 25% to 85% of a total area of the flat sheet.

6. The self-muffling acoustic duct assembly of claim 4, wherein the flat sheet of at least one of the two or more reinforced thermoplastic composite laminate layers has one or more weld tabs cut into the flat sheet.

7. The self-muffling acoustic duct assembly of claim 1, wherein the two or more reinforced thermoplastic composite laminate layers comprise a spiral wound inner tape layer and a spiral wound outer tape layer, such that the spiral wound inner tape layer is wrapped in a first direction and the spiral wound outer tape layer is wrapped in a second direction opposite the first direction to provide the plurality of openings, and the thermoplastic film sealing layer is embedded between the spiral wound inner tape layer and the spiral wound outer tape layer.

8. The self-muffling acoustic duct assembly of claim 1, wherein the thermoplastic film sealing layer comprises one or more of, polyetheretherketone (PEEK), metallized polyetheretherketone (MPEEK), polyetherketoneketone (PEKK), polyvinyl fluoride (PVF), and polyetherimide (PEI).

9. The self-muffling acoustic duct assembly of claim 1, wherein the thermoplastic film sealing layer has a plurality of weld clearance holes formed through the thermoplastic film sealing layer, to enable thermal welding of the thermoplastic film sealing layer directly to one or more of the two or more reinforced thermoplastic composite laminate layers.

10. The self-muffling acoustic duct assembly of claim 1, wherein the insulation and noise attenuating layer comprises one of, an open cell foam, a fiberglass batting, or an aramid felt.

11. The self-muffling acoustic duct assembly of claim 1, wherein the duct is a straight duct.

12. An aircraft comprising:

an environmental control system comprising:

an air conditioning unit; and one or more self-muffling acoustic duct assemblies, each self-muffling acoustic duct assembly comprising:

a duct having a tube shape, the duct comprising:

two or more reinforced thermoplastic composite laminate layers forming a duct structure of the duct, the two or more reinforced thermoplastic composite laminate layers having a plurality of openings for noise to travel through the duct; and a thermoplastic film sealing layer embedded between the two or more reinforced thermoplastic composite laminate layers, the thermoplastic film sealing layer forming a barrier to prevent leakage of air from the duct and being transparent to the noise traveling through the duct;

an insulation and noise attenuating layer coupled to, and covering, the duct structure; and a thermoplastic film outer layer coupled to the insulation and noise attenuating layer, wherein each self-muffling acoustic duct assembly provides noise attenuation in a cabin of the aircraft, and further wherein the duct allows transmission of the noise through the duct and into the insulation and noise attenuating layer where the noise is attenuated, while avoiding delamination of the thermoplastic film sealing layer in the duct, and while avoiding use of one or more separate zone mufflers in the duct.

13. The aircraft of claim 12, wherein the two or more reinforced thermoplastic composite laminate layers of each of the one or more self-muffling acoustic duct assemblies each comprises a flat sheet with the plurality of openings formed through the flat sheet, and the plurality of openings having an open area in a range of 25% to 85% of a total area of the flat sheet.

14. The aircraft of claim 12, wherein the two or more reinforced thermoplastic composite laminate layers of each of the one or more self-muffling acoustic duct assemblies comprise a spiral wound inner tape layer and a spiral wound outer tape layer, such that the spiral wound inner tape layer is wrapped in a first direction and the spiral wound outer tape layer is wrapped in a second direction opposite the first direction to provide the plurality of openings, and the thermoplastic film sealing layer is embedded between the spiral wound inner tape layer and the spiral wound outer tape layer.

15. A method of using one or more self-muffling acoustic duct assemblies to attenuate noise in a vehicle, the method comprising steps of:

forming the one or more self-muffling acoustic duct assemblies, each of the one or more self-muffling acoustic duct assemblies comprising:

a duct having a tube shape, the duct comprising:

two or more reinforced thermoplastic composite laminate layers forming a duct structure of the duct, the two or more reinforced thermoplastic composite laminate layers having a plurality of openings for the noise to travel through the duct; and a thermoplastic film sealing layer embedded between the two or more reinforced thermoplastic composite laminate layers, the thermoplastic film sealing layer forming a barrier to prevent leakage of air from the duct and being transparent to the noise traveling through the duct;

an insulation and noise attenuating layer coupled to, and covering, of the duct structure; and a thermoplastic film outer layer coupled to the insulation and noise attenuating layer;

coupling the one or more self-muffling acoustic duct assemblies to an environmental control system in the vehicle; and using the one or more self-muffling acoustic duct assemblies to attenuate the noise in a passenger area of the vehicle, by allowing transmission of the noise through the duct and into the insulation and noise attenuating layer, while avoiding delamination of the thermoplastic film sealing layer in the duct, and while avoiding use of one or more separate zone mufflers in the duct.

16. The method of claim 15, wherein the step of forming the self-muffling acoustic duct assembly further comprises sub-steps of:

forming the plurality of openings in each of two flat sheets of the two or more reinforced thermoplastic composite laminate layers comprising a reinforced thermoplastic composite laminate inner layer and a reinforced thermoplastic composite laminate outer layer, wherein the plurality of openings in each of the two flat sheets are matched in size and aligned with each other;

laminating a film flat sheet of the thermoplastic film sealing layer to the reinforced thermoplastic composite laminate inner layer;

laminating the reinforced thermoplastic composite laminate outer layer to the film flat sheet of the thermoplastic film sealing layer, so that the thermoplastic film sealing layer is embedded between the reinforced thermoplastic composite laminate inner layer and the reinforced thermoplastic composite laminate outer layer;

rolling on a cylindrical mandrel the two flat sheets of the reinforced thermoplastic composite laminate layers and the film flat sheet of the thermoplastic film sealing layer laminated and embedded between the two flat sheets to form the duct having the tube shape;

bonding together the duct at one or more seams;

forming an acoustic treatment comprising the insulation and noise attenuating layer with the thermoplastic film outer layer laminated to the insulation and noise attenuating layer; and coupling the acoustic treatment over the duct structure.

17. The method of claim 16, wherein the sub-step of forming the plurality of openings in each of the two flat sheets of the reinforced thermoplastic composite laminate layers further comprises:

forming the plurality of openings via one of, cutting, punching, machining, perforating, or routing the plurality of openings, so that the plurality of openings of each of the two flat sheets has an open area in a range of 25% to 85% of a total area of each of the two flat sheets.

18. The method of claim 16, wherein the sub-step of laminating the film flat sheet of the thermoplastic film sealing layer to the reinforced thermoplastic composite laminate inner layer, and the sub-step of laminating the reinforced thermoplastic composite laminate outer layer to the film flat sheet of the thermoplastic film sealing layer, further comprise:

laminating via one of:

thermal welding;

thermal welding with a plurality of weld clearance holes formed through the thermoplastic film sealing layer;

thermal welding an extension portion at a thermal weld line, on the reinforced thermoplastic composite laminate inner layer, or on the reinforced thermoplastic composite laminate outer layer;

thermal welding with the flat sheet of at least one of the two or more reinforced thermoplastic composite laminate layers having one or more weld tabs cut into the flat sheet; or adhesive bonding.

19. The method of claim 15, wherein the step of forming the one or more self-muffling acoustic duct assemblies further comprises sub-steps of:

providing the two or more reinforced thermoplastic composite laminate layers comprising an inner tape layer and an outer tape layer;

spiral wrapping the inner tape layer, in a first direction on a cylindrical mandrel, to form a spiral wound inner tape layer;

wrapping a film flat sheet of the thermoplastic film sealing layer over the spiral wound inner tape layer on the cylindrical mandrel;

spiral wrapping the outer tape layer, in a second direction opposite the first direction on the cylindrical mandrel, over the film flat sheet of the thermoplastic film sealing layer, to form a spiral wound outer tape layer, and to obtain the duct, so that the thermoplastic film sealing layer is embedded between the spiral wound inner tape layer and the spiral wound outer tape layer, and so that the plurality of openings are provided between the spiral wound inner tape layer and the spiral wound outer tape layer;

forming an acoustic treatment comprising the insulation and noise attenuating layer with the thermoplastic film outer layer laminated to the insulation and noise attenuating layer; and coupling the acoustic treatment over the duct structure.

20. The method of claim 15, wherein the step of using the one or more self-muffling acoustic duct assemblies to attenuate the noise in the passenger area of the vehicle, further comprises:

using the one or more self-muffling acoustic duct assemblies to attenuate the noise comprising airflow noise of the environmental control system, in the passenger area comprising a cabin, of the vehicle comprising an aircraft.

* * * * *